United States Patent
Beard et al.

(10) Patent No.: US 11,675,065 B2
(45) Date of Patent: Jun. 13, 2023

(54) DAMAGE DETECTION USING TWO-STAGE COMPRESSIVE SENSING

(71) Applicant: Advent Innovations Limited Company, Columbia, SC (US)

(72) Inventors: Shawn Beard, Bishop, CA (US); Ritubarna Banerjee, Irmo, SC (US)

(73) Assignee: ADVENT INNOVATIONS LIMITED COMPANY, Columbia, SC (US)

( * ) Notice: Subject to any disclaimer, the term of this patent is extended or adjusted under 35 U.S.C. 154(b) by 0 days.

(21) Appl. No.: 17/571,624

(22) Filed: Jan. 10, 2022

(65) Prior Publication Data

US 2022/0291368 A1 Sep. 15, 2022

Related U.S. Application Data

(60) Provisional application No. 63/158,518, filed on Mar. 9, 2021.

(51) Int. Cl.
*G01S 7/52* (2006.01)
*G01S 7/53* (2006.01)

(52) U.S. Cl.
CPC ...... *G01S 7/52022* (2013.01); *G01S 7/52004* (2013.01); *G01S 7/53* (2013.01)

(58) Field of Classification Search
CPC .... G01S 7/52022; G01S 7/52004; G01S 7/53; G01N 29/0654; G01N 29/449; G01N 29/46; G01N 2291/0258; G01N 29/043; G01N 29/069
See application file for complete search history.

(56) References Cited

U.S. PATENT DOCUMENTS

2022/0291368 A1\* 9/2022 Beard ................. G01N 29/449

\* cited by examiner

*Primary Examiner* — Daniel Pihulic
(74) *Attorney, Agent, or Firm* — Burr & Forman LLP; Douglas L. Lineberry

(57) ABSTRACT

Described herein are Compressive Sensing algorithms developed for automated reduction of NDE/SHM data from pitch-catch ultrasonic guided waves as well as a methodology using Compressive Sensing at two stages in the data acquisition and analysis process to detect damage: (1) temporally undersampled sensor signals from (2) spatially undersampled sensor arrays, resulting in faster data acquisition and reduced data sets without any loss in damage detection ability.

19 Claims, 49 Drawing Sheets

$$s_i(t) = \sum_{k=1}^{K} D_k \psi_{ik}(t)$$

$$\psi_{ik}(t) = h(t - TOF_{ik}) \cdot b$$

$h$ is the actuator input waveform
$b$ is an attenuation factor

Generate Ψ, given:
- *Grid point coordinates*
- *Actuator/sensor coordinates*
- *Actuator input waveform*
- *Wave velocity (as a function of direction)*

Fully sampled signals and paths
- 1000 sample points per signal
- 120 paths
Undersampled signals and paths
- 400 sample points per signal
- 80 paths
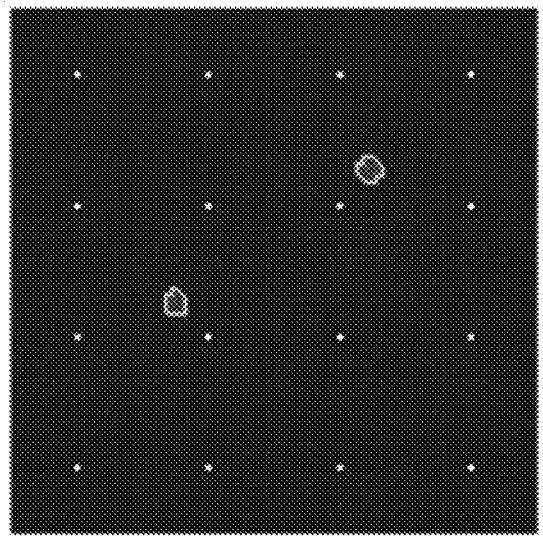
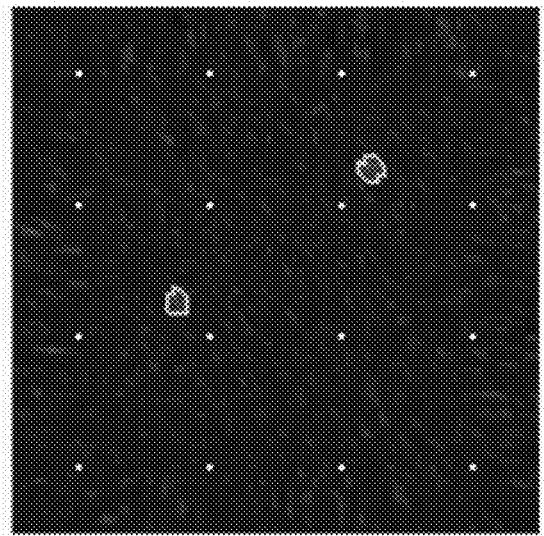
FIG. 27

- Correlation Coefficients are plotted to quantify reconstruction ability vs. sample points for all selected basis functions

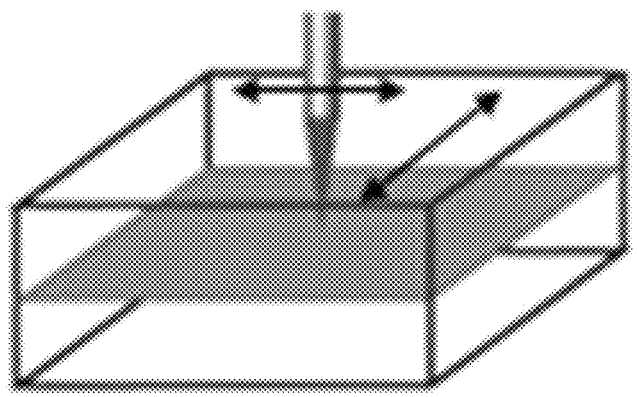
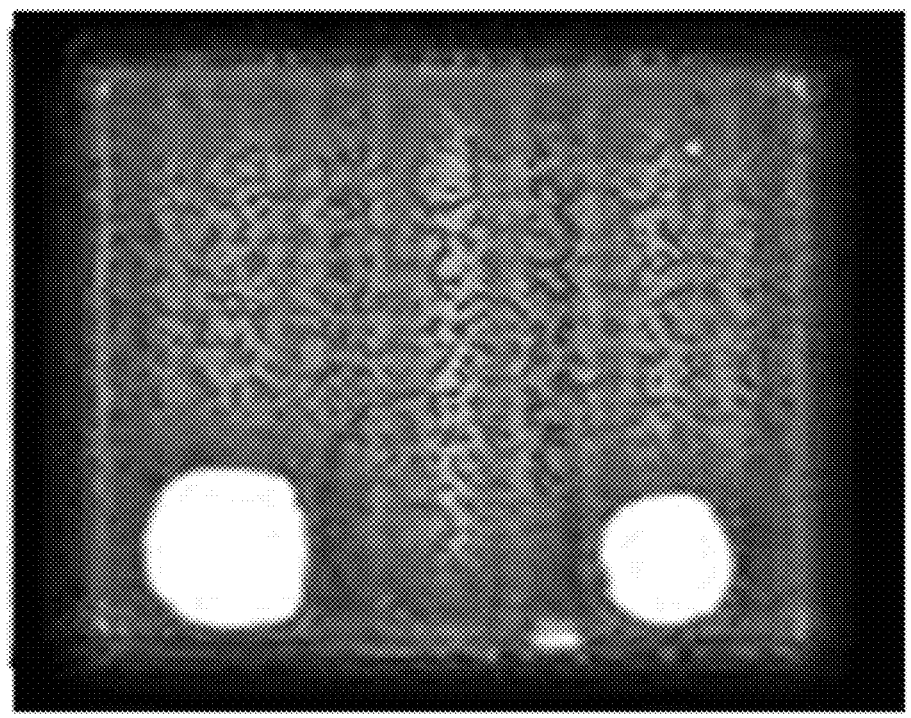
FIG. 37B

DAMAGE DETECTION USING TWO-STAGE COMPRESSIVE SENSING

STATEMENT REGARDING FEDERALLY SPONSORED RESEARCH

This disclosure was made with government support under NASA Contract Nos. 80NSSC19C0592 and 80NSSC20C0200. The government has certain rights in the disclosure.

TECHNICAL FIELD

The subject matter disclosed herein is generally directed to Compressive Sensing algorithms developed for automated reduction of NDE/SHM data from pitch-catch ultrasonic guided waves as well as a methodology using Compressive Sensing at two stages in the data acquisition and analysis process to detect damage: (1) temporally undersampled sensor signals from (2) spatially undersampled sensor arrays, resulting in faster data acquisition and reduced data sets without any loss in damage detection ability.

BACKGROUND

NASA is developing new vehicles for human space flight. The Orion crew module is a reusable capsule that provides a habitat for the crew and facilitates exploration of the Moon, asteroids, and Mars. The Space Launch System (SLS) is a heavy lift system and is part of NASA's deep space exploration plans. The SLS will carry humans beyond low Earth orbit and will deliver elements of the Lunar Orbital Platform-Gateway. Many of these spacecraft are targeted for long-term use, which offers challenges for inspection and maintenance. In orbit or on the Moon, the use of traditional NDE is prohibitive because of location and inaccessibility, and infrequent inspection can lead to conservative, high-weight designs. NASA is seeking technologies to facilitate inspections on large complex structures and provide reliable assessments of structural health.

Structural health monitoring (SHM) can help overcome inspection difficulties and has shown good results on small structures. However, transition to large complex structures has been slow. Some reasons for the slow adoption are difficulties with large sensor arrays, timely analysis of large data sets, and overall weight of the system. In order to realize the benefits of SHM, there is a need to reduce the number of sensors and minimize data acquisition processes while maintaining the ability to accurately detect, locate, and characterize damage.

Accordingly, it is an object of the present disclosure to help reduce sensor data acquisition and processing burdens, as well as be used in applications such as the Combined Loads Test System (COLTS) facility at NASA Langley Research Center.

Citation or identification of any document in this application is not an admission that such a document is available as prior art to the present disclosure.

SUMMARY

The above objectives are accomplished according to the present disclosure by providing a method for employing compressive sensing to sense damage in a structure. The method may include employing at least one spatially undersampled sensor array, obtaining at least one temporally undersampled sensor signal from the at least one spatially undersampled sensor array, employing comprehensive sensing to reconstruct data from the at least one temporally undersampled sensor signal to generate a reconstructed signal, and generating a diagnostic image of the structure based on the reconstructed data. Further, the at least one temporally undersampled sensor signal may result from missing actuator-sensor paths in the sensor array. Again, the method may be employed to diagnose a space structure. Still further, the method employs at least one algorithm processed by an ultrasound software package. Yet again, the method may reconstruct at least one sensor signal via using the at least one temporally undersampled signal, an appropriate basis function, and a measurement matrix. Still yet, the method may utilize a subroutine to determine a best basis function for the at least one temporally undersampled signal. Moreover, subroutine may incorporate a Gini Index to find a basis function that provides a sparsest signal in a transform domain. Even further, the at least one temporally undersampled signal may be an ultrasound signal. Still again, the algorithm may be a sparse recovery algorithm. Yet further, the algorithm may be a $\ell 1$-norm minimization.

In a further embodiment, a diagnostic method for employing compressive sensing is provided. The method may include receiving a sensor signal from a sensor network affixed to a structure that transmits at least one signal to the structure and receives the at least one signal after encountering the structure, when the sensor signal received from the sensor network is undersampled in time and/or undersampled in space, the diagnostic method may engage at least one preprocessing module to run only once to generate at least one basis function for at least one compressive sensing algorithm, engage at least one signal reconstruction module containing the at least one compressive sensing algorithm, wherein the at least one reconstruction module reconstructs at least one temporally undersampled sensor signal, engage at least one second reconstruction module containing the at least one compressive sensing algorithm to reconstruct at least one spatially undersampled sensor signal, and determine whether damage has occurred to the structure via reconstruction of at least one temporally undersampled sensor signal and/or at least one spatially undersampled sensor signal. Further, the diagnostic method may be employed with at least one structural health monitoring system. Again, the diagnostic method may engage at least two preprocessing modules. Yet still, the at least one signal may be an ultrasound signal. Furthermore, the method may reconstruct at least one reconstructed sensor signal via using the at least one signal, an appropriate basis function, and a measurement matrix. Still yet, the method may utilize a subroutine to determine a best basis function for the at least one signal. Still further yet, the subroutine may incorporate a Gini Index to find a basis function that provides a sparsest signal in a transform domain. Moreover, the at least one compressive sensing algorithm may be a sparse recovery algorithm. Still yet, the sparse recovery algorithm may be a $\ell 1$-norm minimization.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 27 shows a comparison of diagnostic images from fully-sampled and undersampled data.

FIG. 37B shows C-scan data and an image thereof.

Figure 1:
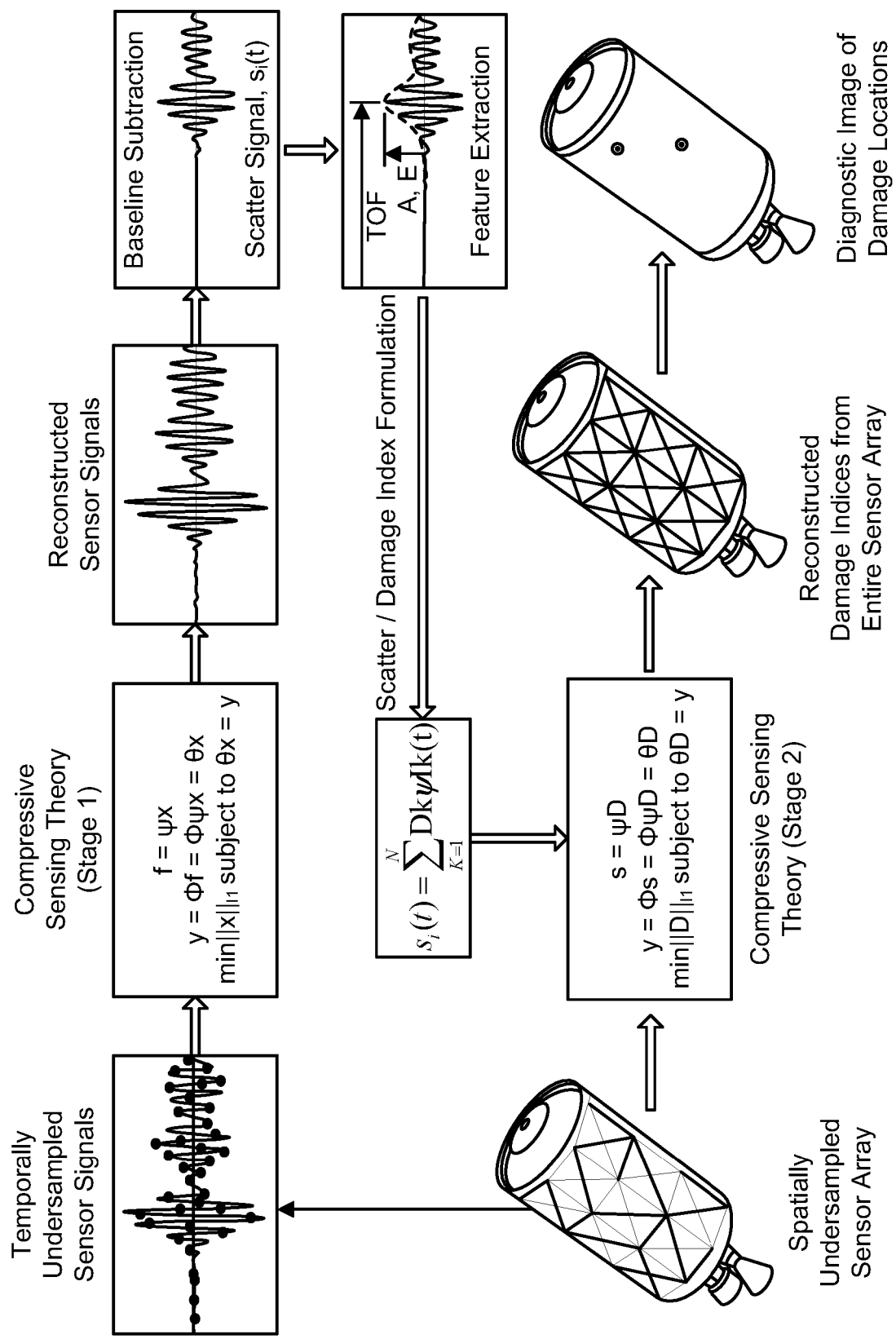
FIG. 1 shows damage detection using two-stage compressive sensing.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Compressive Sensing has been shown to greatly reduce data acquisition and processing burdens by providing mathematical guarantees for accurate signal recovery from far fewer samples than conventionally needed. Compressive Sensing algorithms were developed for automated reduction of NDE/SHM data from pitch-catch ultrasonic guided waves. The methodology uses Compressive Sensing at two stages in the data acquisition and analysis process to detect damage. The two stages are: (1) temporally undersampled sensor signals from (2) spatially undersampled sensor arrays, resulting in faster data acquisition and reduced data sets without any loss in damage detection ability.

The purpose of the innovation is to reduce data acquisition processes and data storage burdens for NDE/SHM systems while maintaining the ability to accurately detect, locate, and characterize structural damage. The methodology uses Compressive Sensing to reconstruct data at two stages in the data acquisition and analysis process to detect damage and generate a diagnostic image of the structure.

Data may be reconstructed at two stages: (1) temporally undersampled sensor signals from (2) spatially undersampled sensor arrays. A conceptual diagram of the methodology is shown at FIG. 1. FIG. 1 at the top row depicts Stage 1, where temporally undersampled signals are reconstructed using Compressive Sensing. The reconstructed signals are then analyzed and features are extracted to provide inputs into Stage 2, which is depicted in the bottom row. In Stage 2, spatially undersampled sensor data (from missing actuator-sensor paths) are reconstructed to generate a diagnostic image of the structure.

Figure 2:
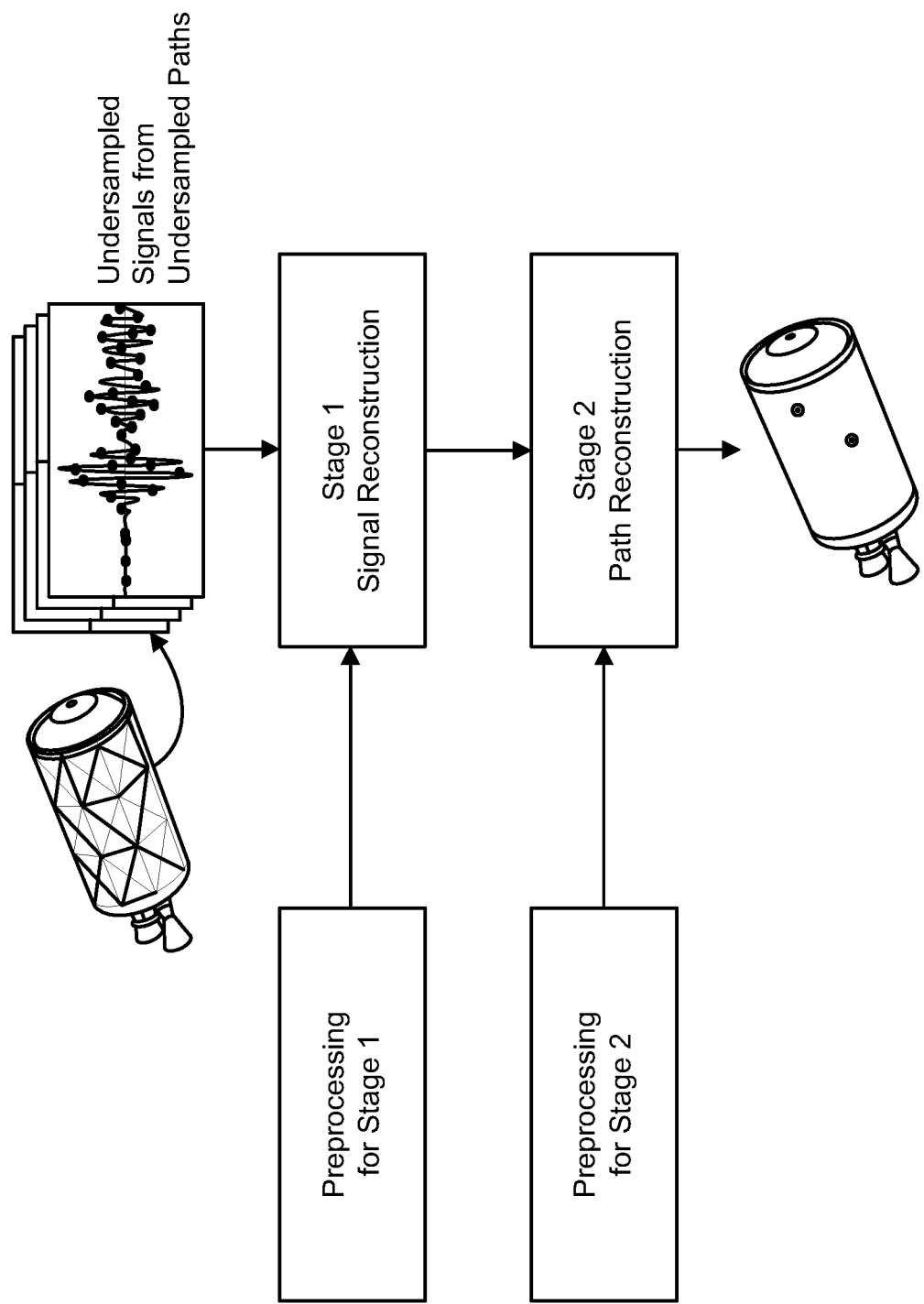
FIG. 2 shows on embodiment of an architecture design of the current disclosure.

FIG. 2 shows the methodology of FIG. 1 broken down into four modules as shown in the diagram. The preprocessing modules are intended to be run only once in order to generate the basis functions required for the Compressive Sensing algorithms that are housed in the Stage 1 and Stage 2 modules. The Stage 1 Signal Reconstruction module contains Compressive Sensing algorithms to enable reconstruction of temporally undersampled sensor signals. The Stage 2 Path Reconstruction module contains Compressive Sensing algorithms for reconstruction of spatially undersampled actuator-sensor paths.

It is anticipated that the first application of the technology will be the integration into NASA's inspection tools for large complex space structures made with composites or thin metals, such as the Orion crew module, Space Launch System, and the Lunar Outpost Platform-Gateway. As NASA continues to direct efforts into deep space flight, smart structures that are instrumented with structural health monitoring (SHM) systems will be needed to provide real time mission critical information of the structure's status. In order for these SHM systems to be viable, the total number of sensors, total weight, and data acquisition requirements must be minimized, and the Compressive Sensing methodology will be critical in achieving this.

Potential commercial customers include Blue Origin and SpaceX, which build large, reusable space launch vehicles. Other non-NASA applications and industries include aerospace (aircraft wings and fuselage), marine (ship hulls), wind energy (rotor blades), transportation/railways, civil infrastructure (buildings and bridges), oil and gas (pipelines), etc. Generally, any industry that uses large structures that require frequent inspection will benefit from the use of the Compressive Sensing technology. Similar benefits can also be realized in the emerging wearable sensors market in the healthcare industry.

Compressive Sensing (CS) has been shown to greatly reduce data acquisition and processing burdens by providing mathematical guarantees for accurate signal recovery from far fewer samples than conventionally needed. In Phase I of this project, algorithms for an ultrasound software package were developed to detect damage in structures using CS at two stages in the data acquisition and analysis process as shown in FIG. 1. The two stages are: (1) temporally undersampled sensor signals from (2) spatially undersampled sensor arrays, resulting in faster data acquisition and reduced data sets without any loss in damage detection ability.

The ultimate goal of this project is to reduce data acquisition requirements (energy consumption, number of sensors, data collection and storage, and total system weight) of NDE/SHM systems. Advent teamed with the University of South Carolina (USC) to design and develop the software package for automated reduction of NDE/SHM data from pitch-catch ultrasonic guided waves.

The specific objectives in the Phase I period were to:

Design a hierarchical modular software architecture for Compressive Sensing of ultrasonic guided waves that is flexible and scalable, allowing it to be easily extended to additional NDE/SHM techniques.

Develop a superior version of USC's feature extraction toolbox (ZIGANAL) that is expanded and enhanced with CS-specific algorithms.

Define and encode orthonormal basis functions to enable robust ultrasonic wave signal reconstruction.

Construct a Damage Index formulation that is robust and consistent with Compressive Sensing theory.

Automate the entire process from data acquisition to display of detected damage.

Conduct extensive functionality testing on experimental and simulated data to demonstrate feasibility.

Software Architecture Design

The software architecture was designed to be flexible and reconfigurable to facilitate rapid module development, simplify module verification and validation, and allow for efficient upgrades to the system. The individual modules were developed based on compressive sensing (CS) theory.

Compressive Sensing Background

CS theory states that one can recover certain signals and images from far fewer samples or measurements than traditional methods (e.g. Nyquist-Shannon). To make this possible, CS relies on two principles: sparsity, which pertains to the signals of interest, and incoherence, which pertains to the sensing modality.

As an example, consider a vector f∈ ℝ $^n$ (such as a sensor signal or n-pixel image), which is expanded in an orthonormal basis (such as a wavelet basis) Ψ=[ψ$_1$ ψ$_2$ . . . ψ$_n$] as follows:

$$f(t)=\Sigma_{i=1}^{n}x_i\psi_i(t) \text{ or } f=\Psi x$$

where x is the coefficient sequence of f. $x_i=\langle f,\psi_i \rangle$ or $x=\omega^T f$ and has k nonzero elements (k»n, k-sparse).

Suppose f has been undersampled during data acquisition, such that y=Φf, where y∈ ℝ $^m$ (m<n) and Φ is the measurement matrix (ψ∈ ℝ $^{m \times n}$). The vector y can be written as $$y=\Phi f=\Phi\Psi x=\Theta x$$

where Θ is an m×n transfer matrix with much fewer rows than columns. Construction of x from y is an underdetermined ill-posed inverse problem because the dimension of y is much small than that of x. However, it has been proven that x and f can be uniquely reconstructed with overwhelming probability if the signal f is sparse and the transfer matrix Θ meets the so-called restricted isometry property (RIP). That is, there exists an isometric constant $\delta_k$ for the matrix Θ where $\delta_k$ is defined as the smallest number which holds for all k-sparse vectors, x, such that:

$$1-\delta_k \leq \frac{\|\Theta x\|_2^2}{\|x\|_2^2} \leq 1 + \delta_k$$

This property essentially requires that every set of columns with cardinality less than k are approximately orthonormal. If the columns of the transfer matrix Θ are orthogonal, then x can be exactly constructed from y. Specifically, incoherence between the sensing (sampling) matrix, Φ, and the dictionary (matrix of representation bases), Ψ, is a requirement to satisfy the RIP and achieve accurate reconstruction with high probability. Random matrices are largely incoherent with any fixed basis Ψ, and for that reason, random sampling was used in the software design.

The signal is then reconstructed through a sparse recovery algorithm, such as ℓ 1-norm minimization.

The software architecture consists of four separate modules, as shown in FIG. 2, consisting of two preprocessing modules and two reconstruction modules.

The preprocessing modules are intended to be run only once to generate the basis functions required for the CS algorithms housed in the Stage 1 and Stage 2 modules. The Stage 1 Signal Reconstruction module contains CS algorithms to enable Reconstruction of Temporally Undersampled Sensor Signals. The Stage 2 Path Reconstruction module contains CS algorithms for Reconstruction of Spatially Undersampled Sensor Arrays. The development of the Preprocessing for Stage 1 module is discussed infra along with development of the Stage 1 Signal Reconstruction module. Development of the Preprocessing for Stage 2 module, as well as the Stage 2 Path Reconstruction module, are also discussed infra.

Automated Feature Extraction Module

The subcontractor, USC, built upon previous work to enhance the existing feature extraction toolbox named ZIGANAL. CS tools and algorithms were added to analyze sparse signals. Specifically, a subroutine was developed to find the best basis function to use for a given signal.

The purpose of Stage 1 is to fully reconstruct a sensor signal given the undersampled signal, an appropriate basis function, and the measurement matrix:

$\hat{f}(t)$     y     Ψ     Φ full_signal = reconstruct_signal(undersampled_signal, basis_function, measurement_matrix)

Figure 3:
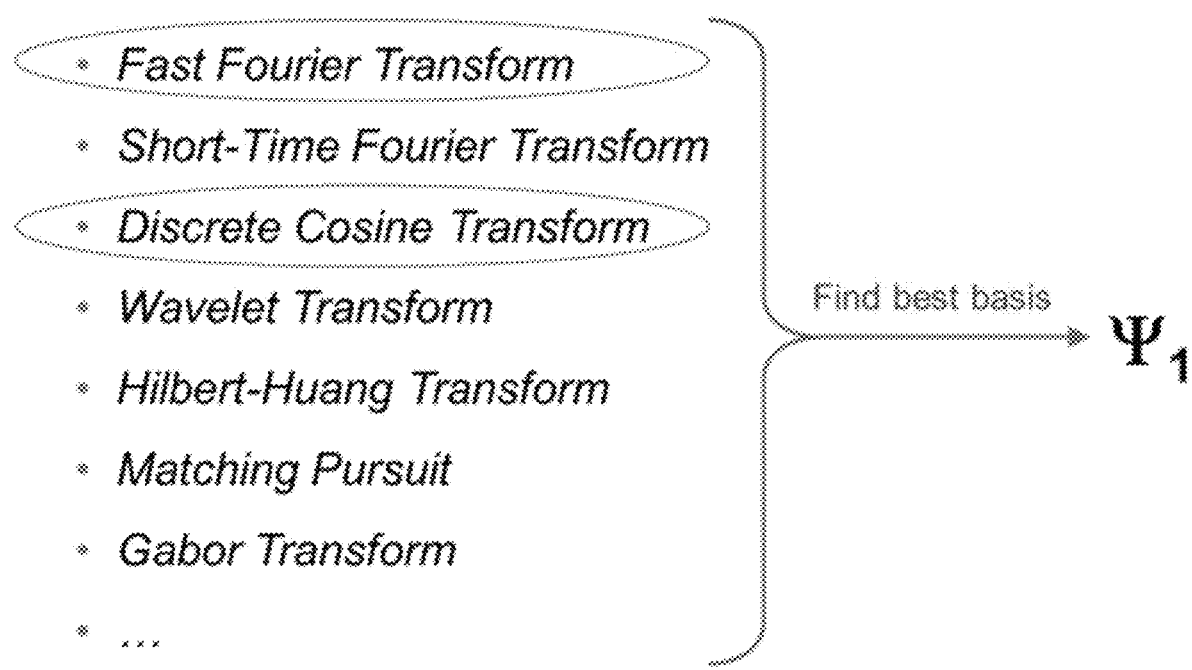
FIG. 3 shows one embodiment of a finding the best basis function of the current disclosure.

But for accurate signal reconstruction, an appropriate basis function must first be found. The Preprocessing for Stage 1 module utilizes a subroutine to find the best basis function for a given signal. This subroutine incorporates the use of the Gini Index to find the basis function that results in the sparsest signal in the transform domain. An assortment of potential basis functions (FIG. 3) are tested and analyzed to determine the basis function that results in the highest correlation coefficient between the reconstructed signal and the fully-sampled signal.

The ultrasound signals being studied in Phase I of this project were sinusoidal in nature, and therefore, the Preprocessing for Stage 1 module consistently selected the Fast Fourier Transform and the Discrete Cosine Transform as the best basis functions for the signals.

Module to Reconstruct Temporally Undersampled Sensor Signals

Figure 4:
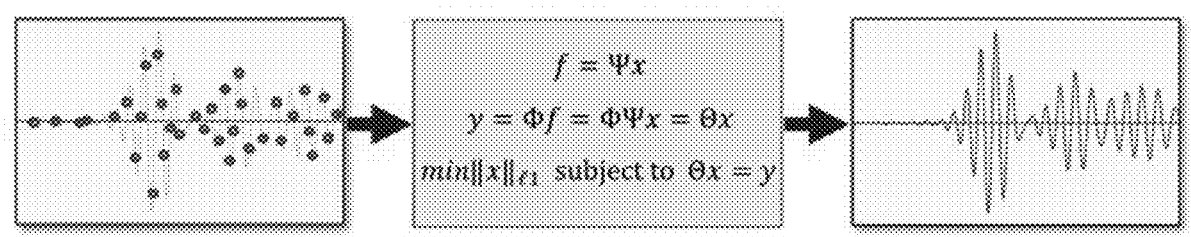
FIG. 4 shows a reconstruction of sensor signals for the current disclosure.
Figure 5:
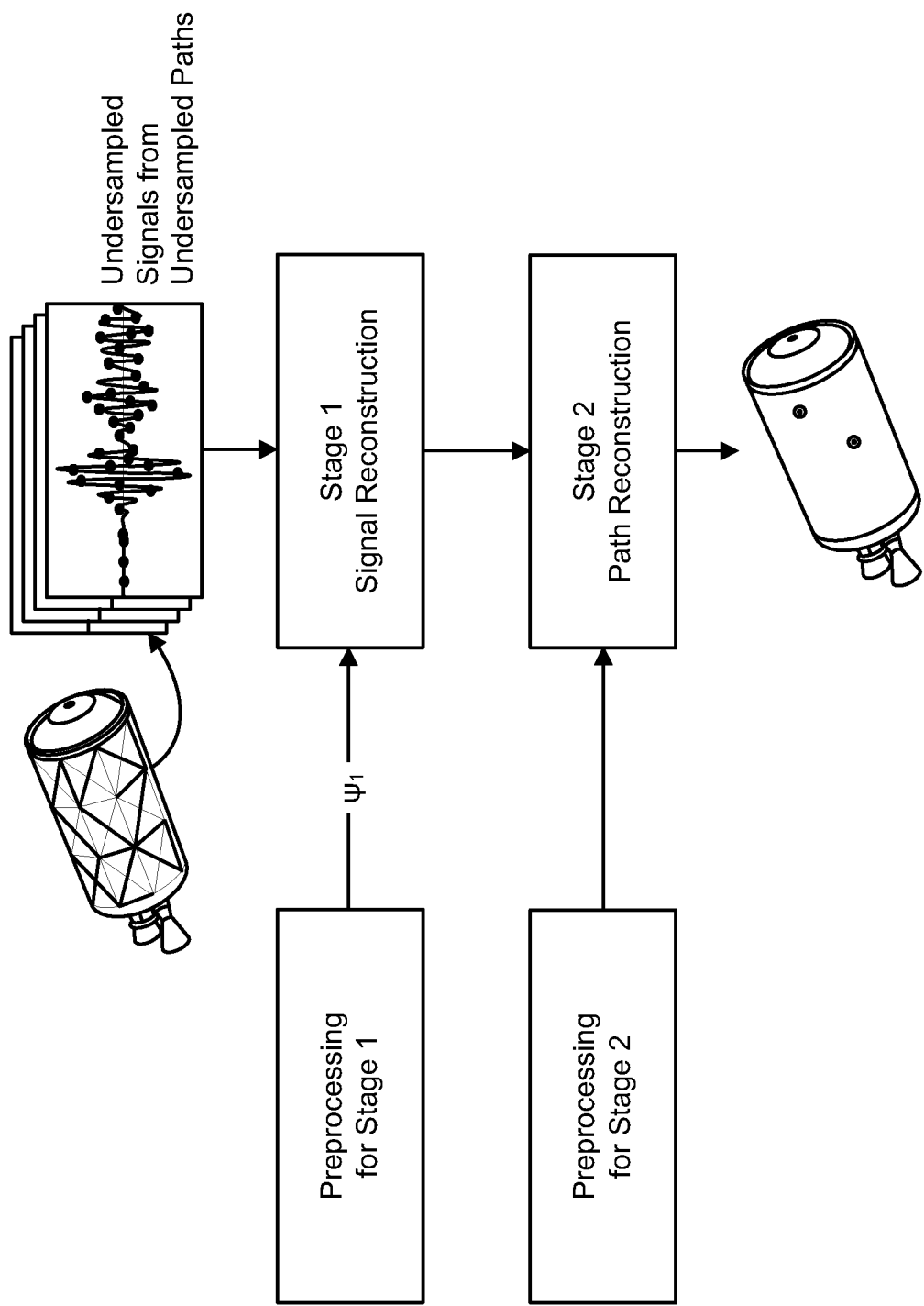
FIG. 5 shows Stage 1 takes the basis function, $\Psi_1$, and the undersampled data as inputs, and generates the necessary data for Stage 2.

The Stage 1 Signal Reconstruction module and submodules were developed in this task. The purpose of this module is to reconstruct undersampled sensor signals using CS theory (FIG. 4), and to provide input into Stage 2 Path Reconstruction (FIG. 5).

The first part of this module uses CS theory with ℓ 1-norm minimization as the sparse recovery algorithm to reconstruct the undersampled sensor signals. Two example signal reconstructions using the module are shown below.

Example 1

Figure 6:
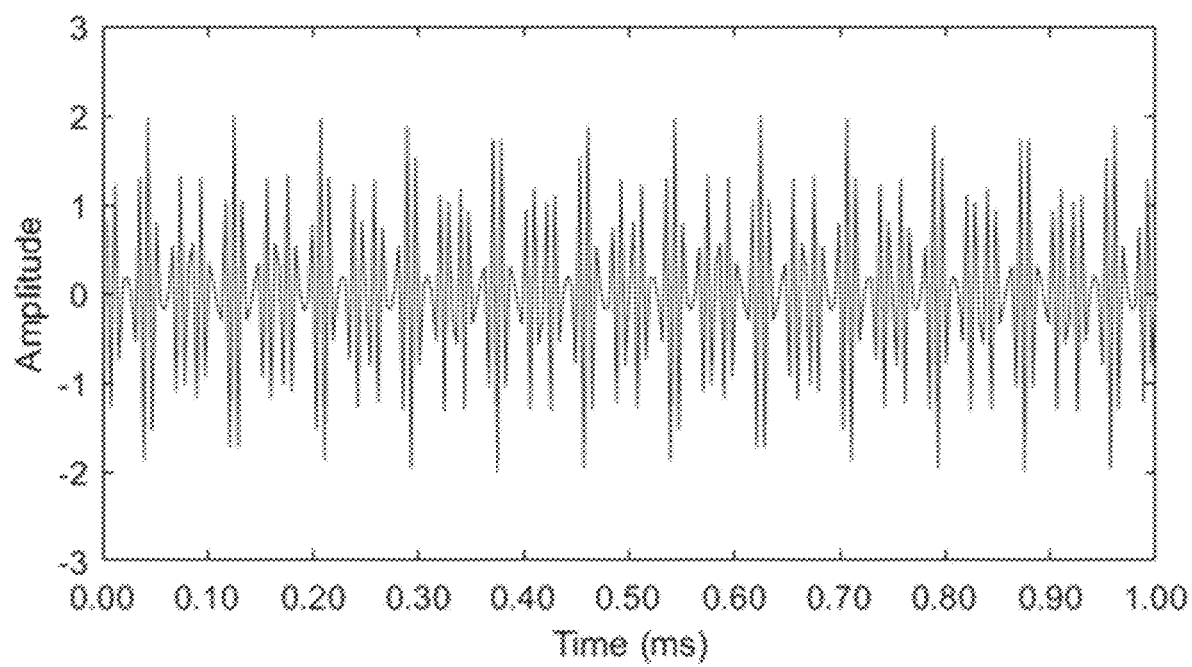
FIG. 6 shows an example signal given by $f(t)=\sin(2\pi(98000)t)+\sin(2\pi(122000)t)$.

The first example is the digital signal shown in FIG. 6. The signal is a combination of two sinusoids given by the following equation:

$$f(t)=\sin(2\pi(98000)t)+\sin(2\pi(122000)t)$$

The sampling frequency is 256 kHz and the number of sample points in 256.

Figure 7:
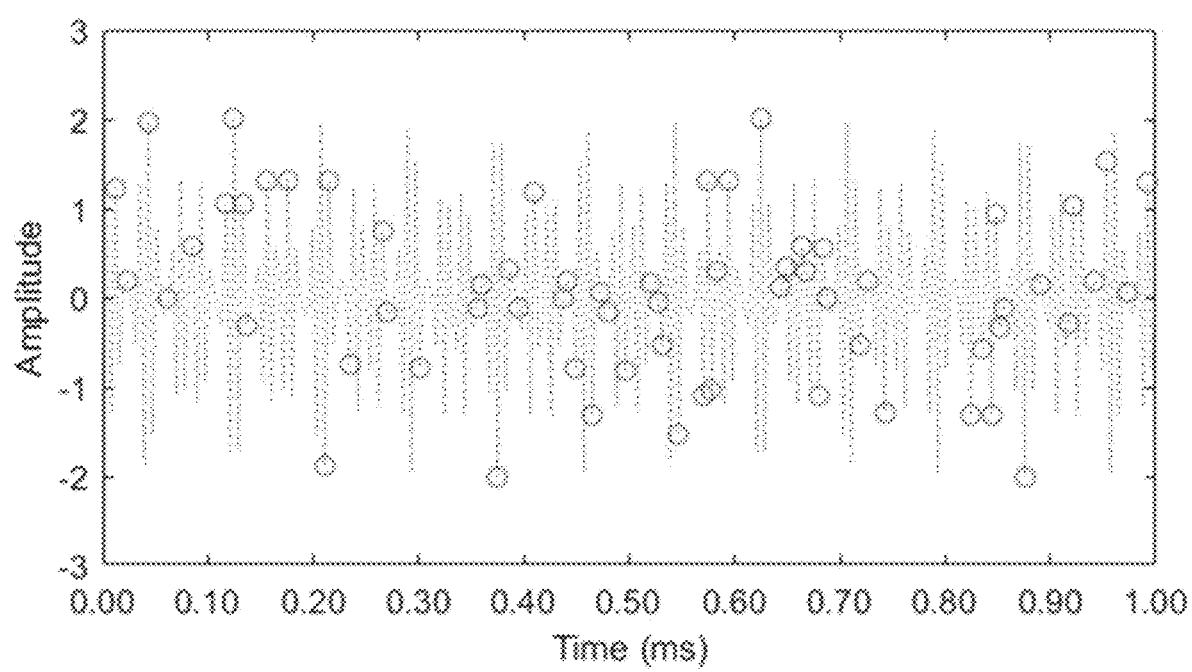
FIG. 7 shows amplitude versus time for 64 random sample points.

Using the subroutine developed herein to find the best basis function, it was found the best basis function to use for this particular signal was Ψ=Fast Fourier Transform. A random measurement matrix was used to obtain 64 random sample points from the signal as shown in FIG. 7.

Figure 8:
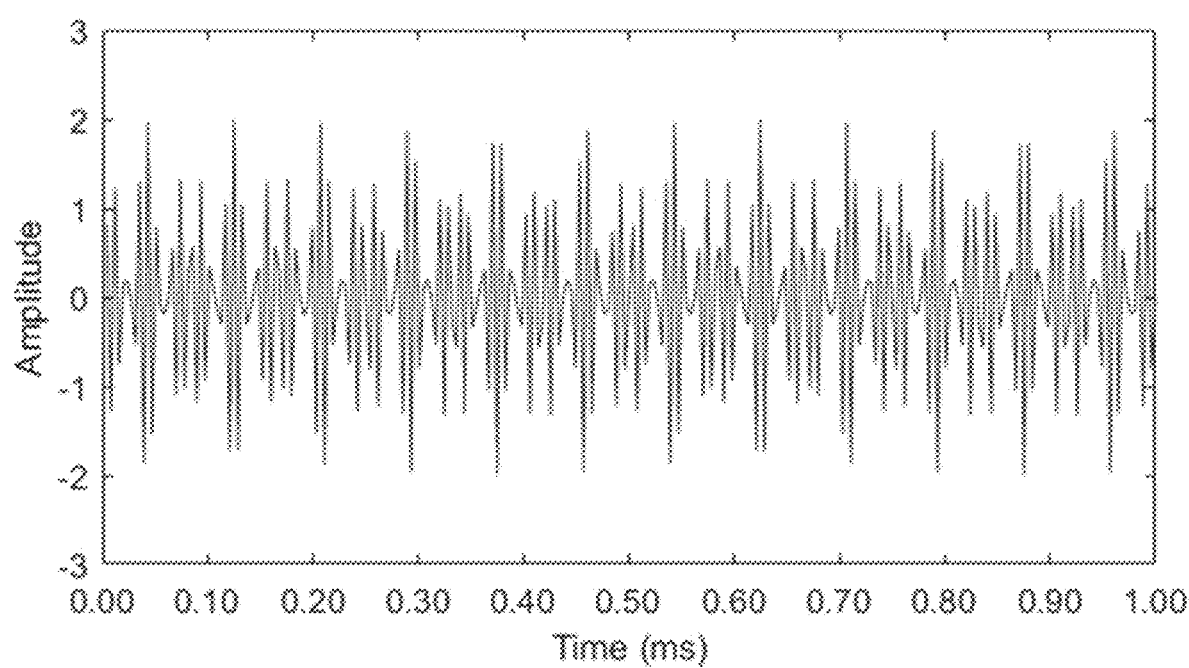
FIG. 8 shows an exact reconstruction of a signal.

Given only the undersampled signal (64 points), basis function (Fast Fourier Transform), and the random measurement matrix, the sparse recovery algorithm (ℓ 1-norm minimization) was able to reconstruct the signal exactly as shown in FIG. 8.

Figure 9:
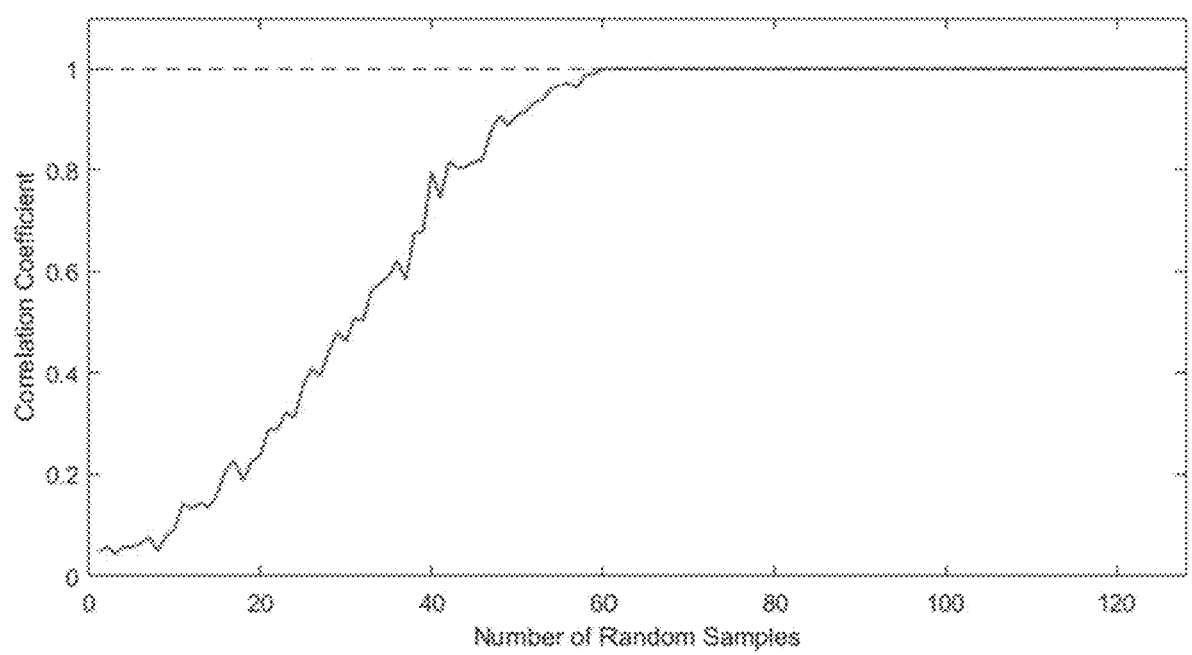
FIG. 9 shows a comparison of a reconstructed and fully-sampled signal.

One hundred and thirty cases were run with a varying number of random sample points to compare the efficacy of the reconstruction. The correlation coefficient of the reconstructed and fully-sampled signal vs. number of random samples is shown in FIG. 9. In this plot, a correlation coefficient of 1 indicates an exact reconstruction, and anything above 0.8 is consider a very close reconstruction. As can be seen, using between 40 and 60 random samples results in good reconstruction, and anything above 60 random samples results in exact reconstruction.

Example 2

Figure 10:
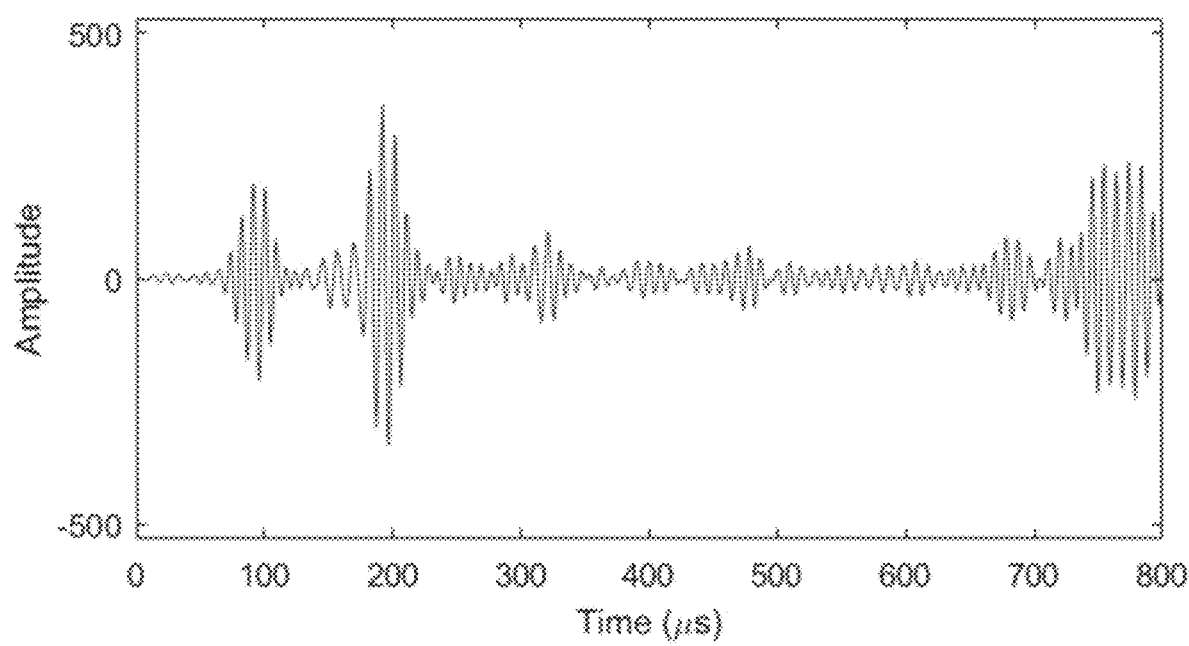
FIG. 10 shows an ultrasound signal from a composite plate.

The second example is a real pitch-catch ultrasound signal (FIG. 10) from a composite plate. The sampling frequency is 1 MHz and the number of sample points is 800.

Figure 11:
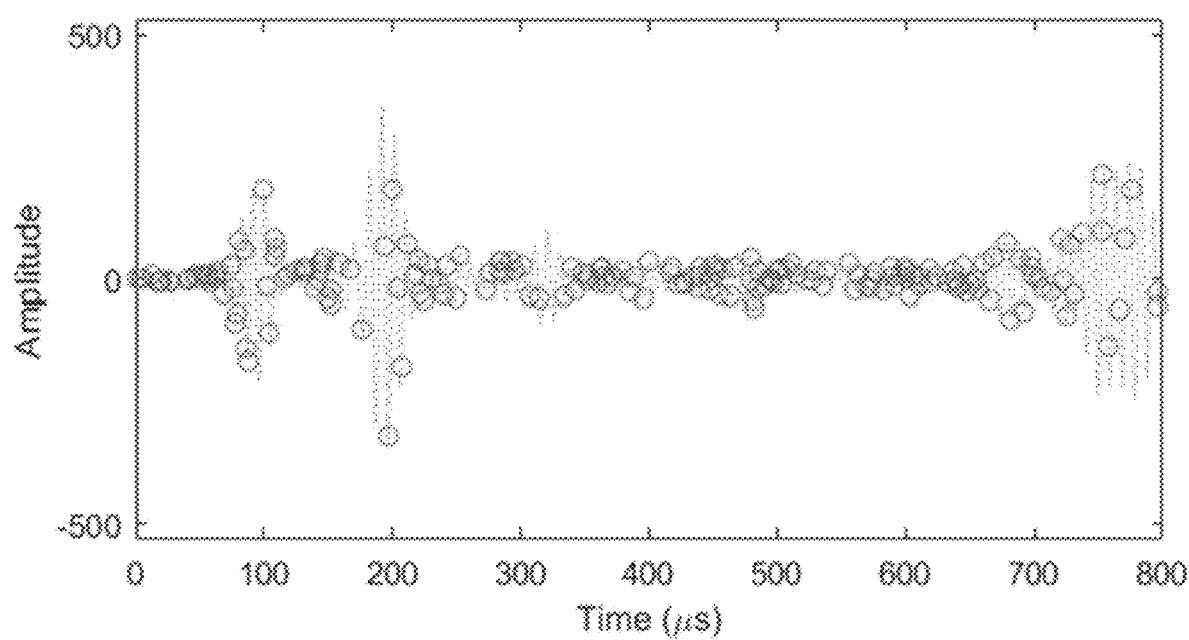
FIG. 11 shows amplitude versus time for 240 random sample points.

Using the subroutine developed herein to find the best basis function, it was found the best basis function to use for this particular signal was Ψ=Discrete Cosine Transform. A random measurement matrix was used to obtain 240 random sample points from the signal as shown in FIG. 11.

Figure 12:
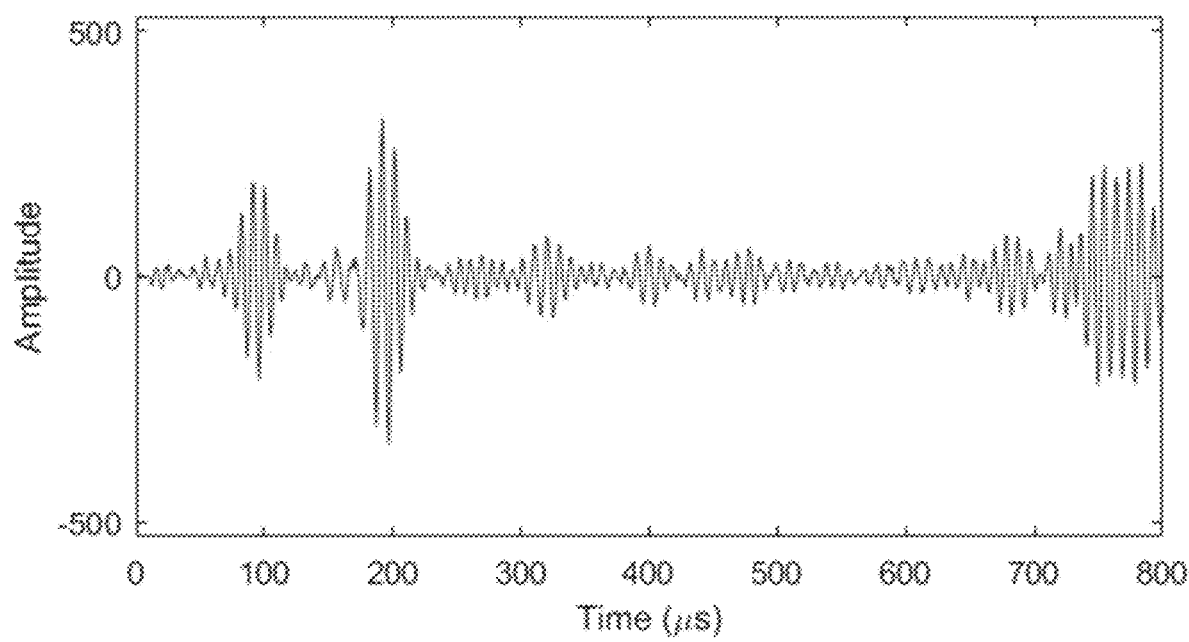
FIG. 12 shows close reconstruction of a sensor signal.

Given only the undersampled signal (240 points), basis function (Discrete Cosine Transform), and the random measurement matrix, the sparse recovery algorithm ($\ell$ 1-norm minimization) was able to perform a close reconstruction of the the signal as shown in FIG. 12.

Figure 13:
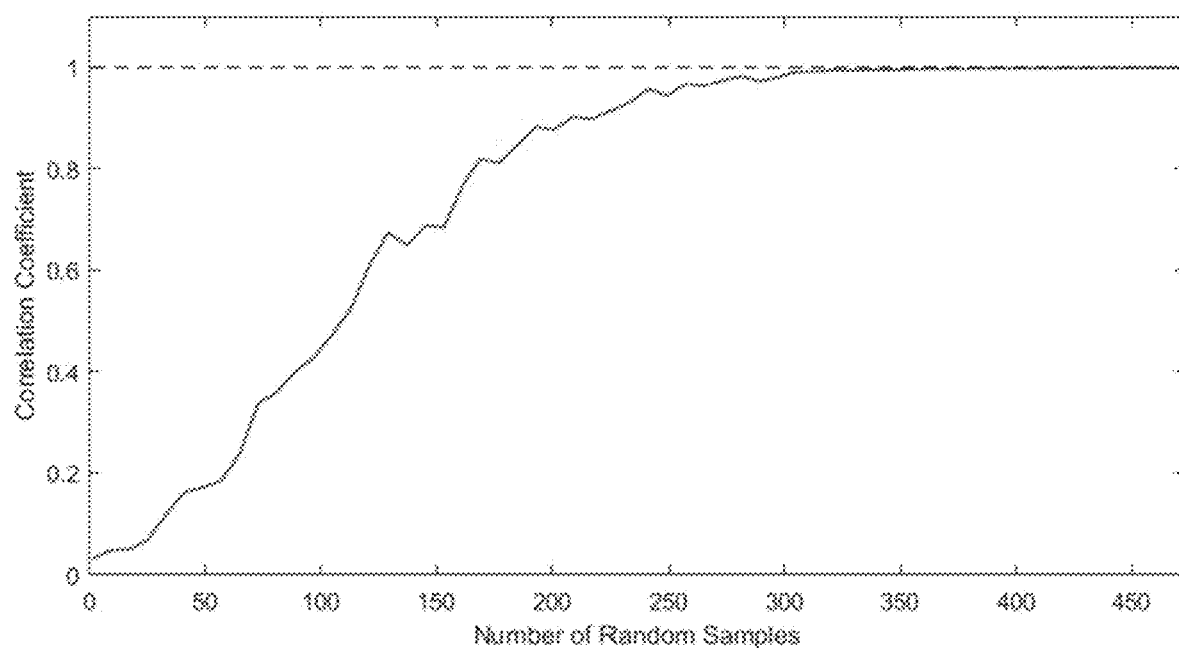
FIG. 13 shows a comparison of a reconstructed and fully-sampled signal.

475 cases were run with varying number of random sample points to compare the efficacy of the reconstruction. The correlation coefficient of the reconstructed and fully-sampled signal vs. number of random samples is shown in FIG. 13. As mentioned previously, a correlation coefficient of 1 indicates an exact reconstruction, and anything above 0.8 is consider a very close reconstruction. As can be seen, using between ~175 and ~325 random samples results in good reconstruction, and anything above ~325 random samples results in exact reconstruction.

Figure 14:
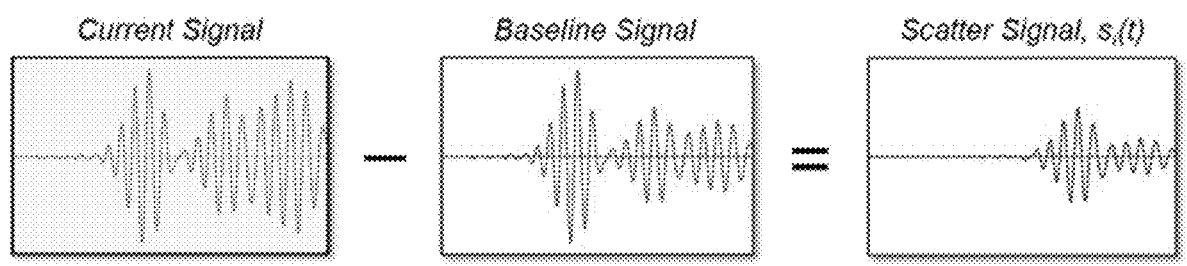
FIG. 14 shows a baseline subtraction to find scatter signal.

After the signals have been reconstructed, they are ready to be analyzed. In addition to the CS submodules above, a "baseline subtraction" submodule was also added. The recovered signals are compared to previously collected baseline signals from the undamaged structure to obtain scatter signals, which are just the difference between the current sensor data and the baseline sensor data (FIG. 14).

Figure 15:
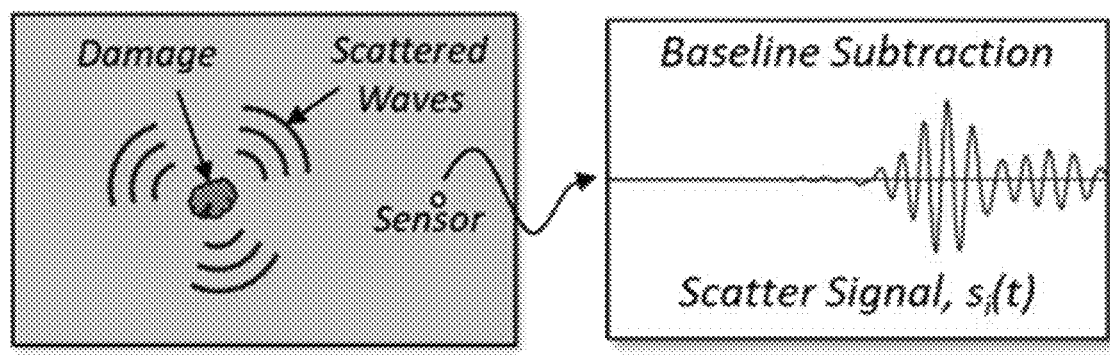
FIG. 15 damage acts an emitter of scatter signals.

The scatter signals contain information about any existing damage in the structure. When a propagating wave encounters damage, the wave is reflected, refracted, and/or diffracted, or some combination of all three, depending on the damage type. The scatter signals represent the reflected, refracted, and diffracted waves, which all emanate from the damage(s). When viewing the scatter field, the damage acts as an emitter source of the scatter signals (FIG. 15).

Figure 16:
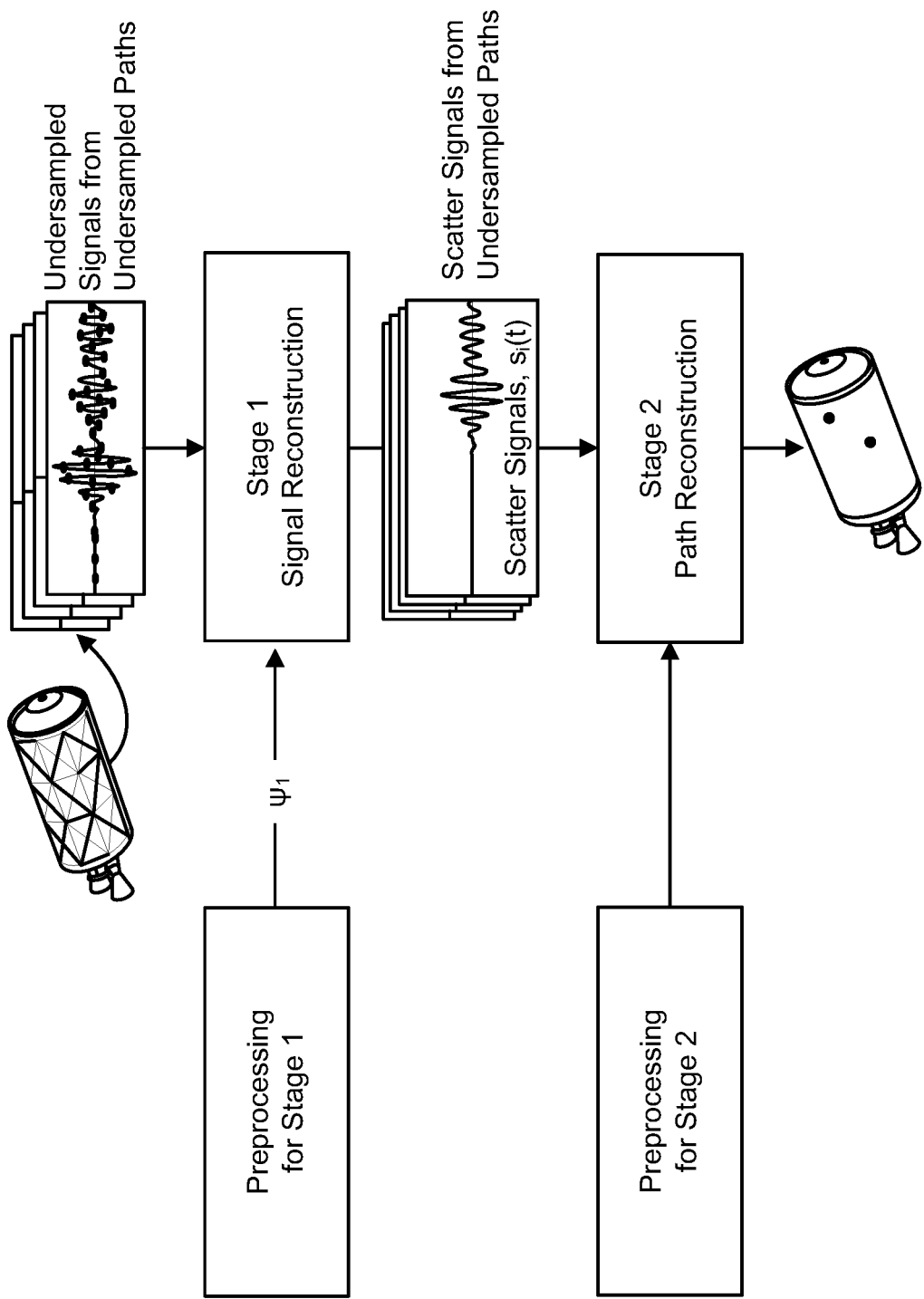
FIG. 16 the output of Stage 1 is the scatter signals from the paths that were sampled.

The output of the Stage 1 Signal Reconstruction module is the scatter signals from all paths that were sampled (FIG. 16). These scatter signals are then used in the Stage 2 Path Reconstruction module described infra.

Module to Reconstruct Spatially Undersampled Sensor Arrays

Figure 17:
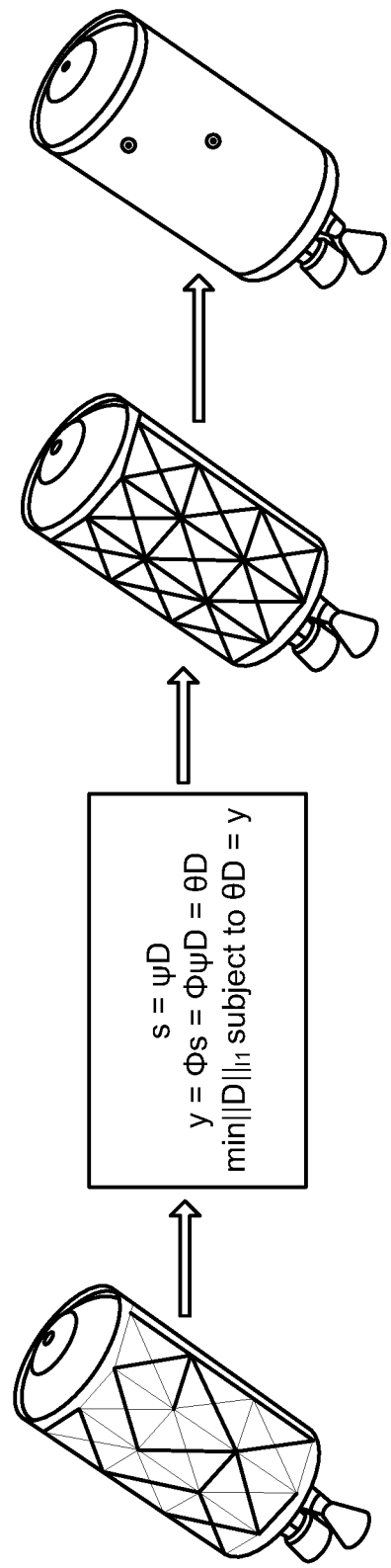
FIG. 17 shows reconstruction of sensor array points.

The Preprocessing for Stage 2 and the Stage 2 Path Reconstruction modules and submodules were developed in this task. The purpose of Stage 2 is to reconstruct spatially undersampled sensor arrays using CS theory (FIG. 17). Specifically, scatter signals from undersampled actuator-sensor paths are reconstructed in order to generate a diagnostic image of the structure without losing accuracy if there are missing actuator-sensor paths.

Figure 18:
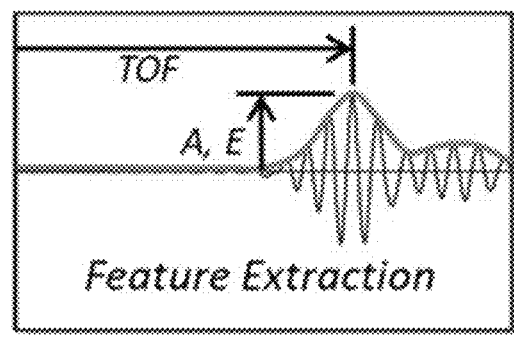
FIG. 18 shows feature extraction.

One method to generate a diagnostic image is to extract features (such as time-of-flight, amplitude, energy) from the scatter signals (FIG. 18) of every actuator-sensor path and calculate a parameter called a Damage Index.

Figure 19:
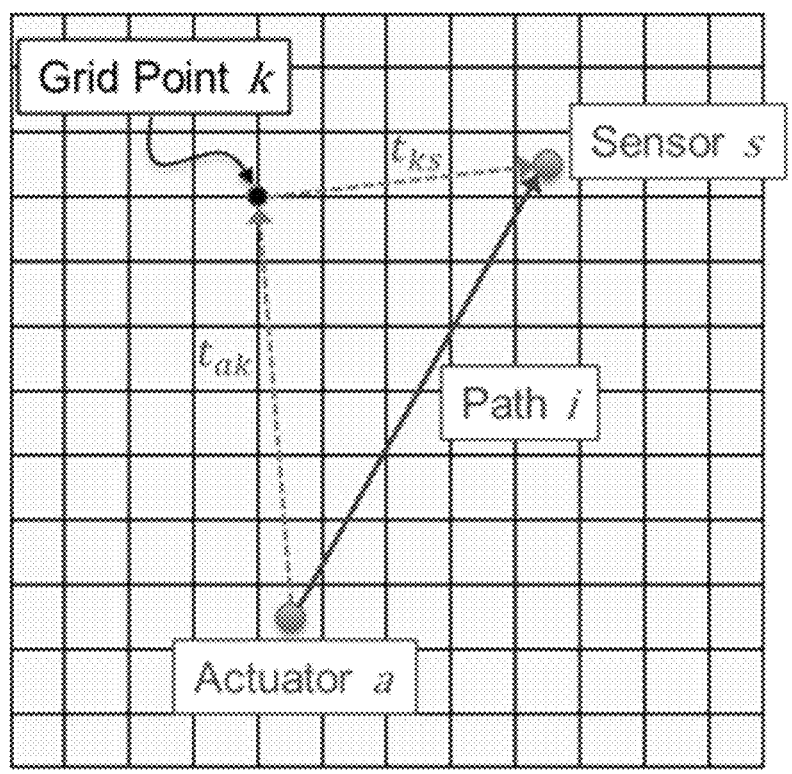
FIG. 19 shows discretized structure and a single actuator-sensor path.

The Damage Indices from each actuator-sensor path can be averaged over the entire structure by discretizing the structure into k grid points:

$$D_k = \frac{1}{N}\sum_{i=1}^{N} D_i(TOF_{ik}, A_{ik}, E_{ik})$$

where k is the grid point, i is the path number, and N is the total number of actuator-sensor paths. The diagram in FIG. 19 shows the discretized structure and a single actuator-sensor path. The time it takes for a wave to propagate from an actuator, a, to a given grid point, k, and then from the grid point to a given sensor, s, is given by $$t_{ak} = \frac{\sqrt{(x_a - x_k)^2 + (y_a - y_k)^2}}{v_{ak}} \text{ and } t_{ks} = \frac{\sqrt{(x_s - x_k)^2 + (y_s - y_k)^2}}{v_{ks}}$$

respectively where $x_a$ and $y_a$ are the actuator coordinates, $x_s$ and $y_s$ are the sensor coordinates, $x_k$ and $y_k$ are the grid point coordinates, and $v_{ak}$ and $v_{ks}$ are the wave velocities, which will vary with direction in anisotropic materials. The wave velocity profile in anisotropic materials is obtained from the time-of-arrival of the first wave packets in the baseline signals. Therefore, in a given scatter signal, the time-of-arrival of a wave emanating from a given grid point is TOF=$t_{ak}$+$t_{ks}$ The resulting $D_k$ represent the probability that damage exists at a particular grid point, k, and are used to generate the diagnostic image.

Figure 20:
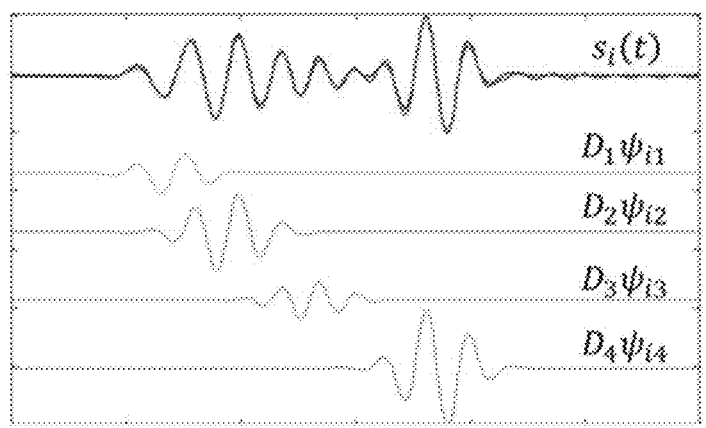
FIG. 20 shows scatter signal expanded in basis, $\Psi$.

Conversely, each scatter signal can be expanded in a basis, Ψ=[$ψ_1$ $ψ_2$ ... $ψ_n$], with $D_k$ as the coefficient sequence as shown in FIG. 20. Note that this formulation is now consistent with CS theory.

Figure 21:
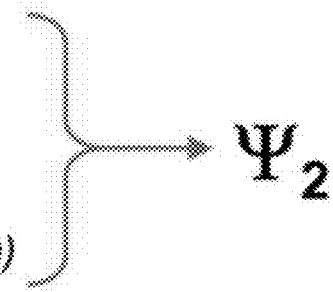
FIG. 21 shows generating the Stage 2 basis function.

The Preprocessing for Stage 2 module contains a subroutine to automatically generate the W array for a given structural application (FIG. 21).

Figure 22:
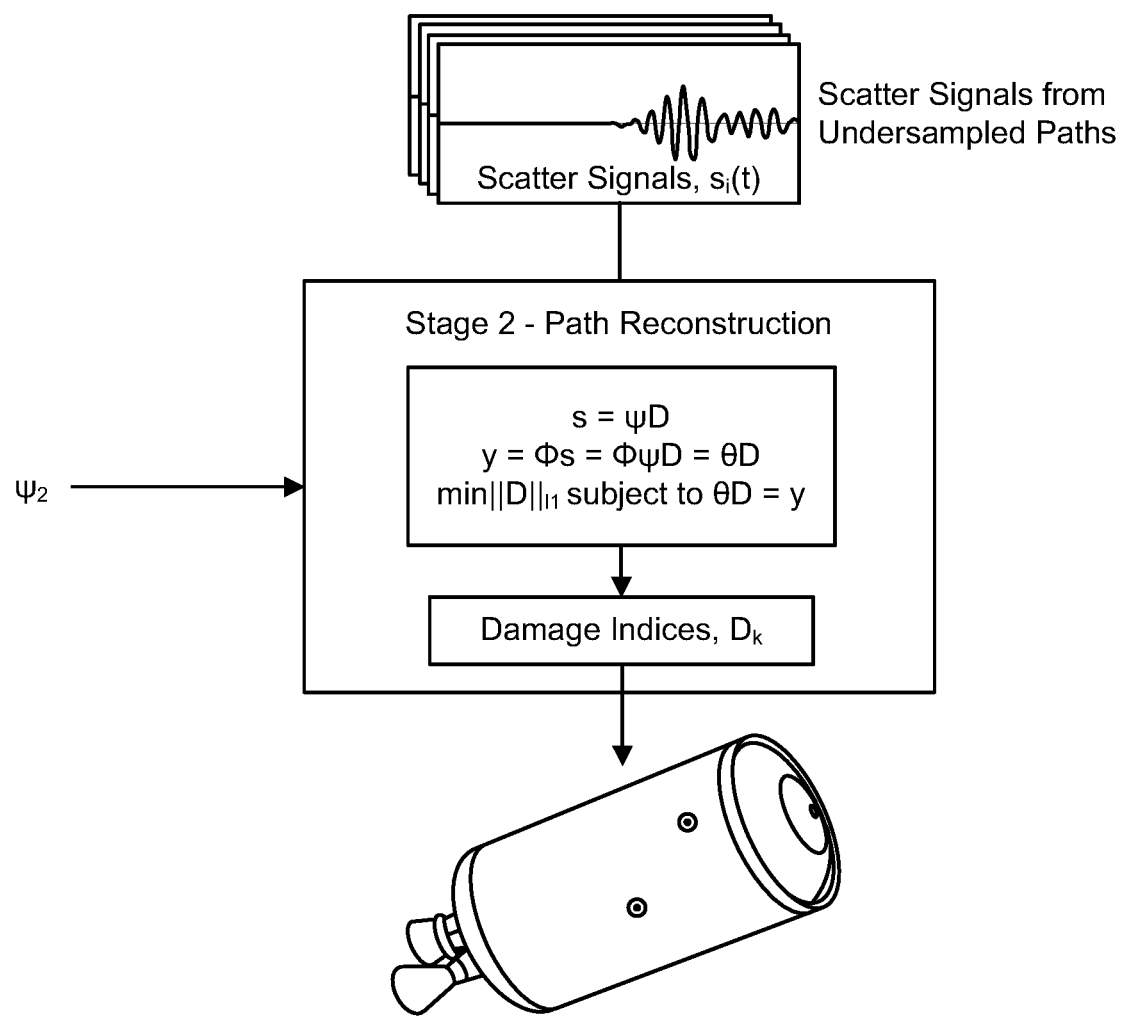
FIG. 22 shows Stage 2 takes the basis function, $\Psi_2$, and the scatter signals as inputs, and generates the Damage Indices, which are then used to create a diagnostic image.

With the generated $Ψ_2$ array, and the Damage Index relations constructed in a formulation consistent with CS theory, the next step is Stage 2 Path Reconstruction. The Stage 2 Path Reconstruction module takes the basis function, $Ψ_2$, and the scatter signals as inputs, and uses CS theory to generate the Damage Indices, which are then used to create a diagnostic image (FIG. 22).

The sparse recovery utilizes $\ell$ 1-norm minimization similar to that in Stage 1, but with added dimensionality because y is a matrix instead of a vector, and $Ψ_2$ is a 3-dimensional array instead of a 2-dimensional matrix.

The recovered Damage Index values, $D_k$, are then mapped to their respective grid point coordinates on the structure, and a diagnostic image is generated highlighting the most probable location and size of any damage on the structure.

Figure 23:
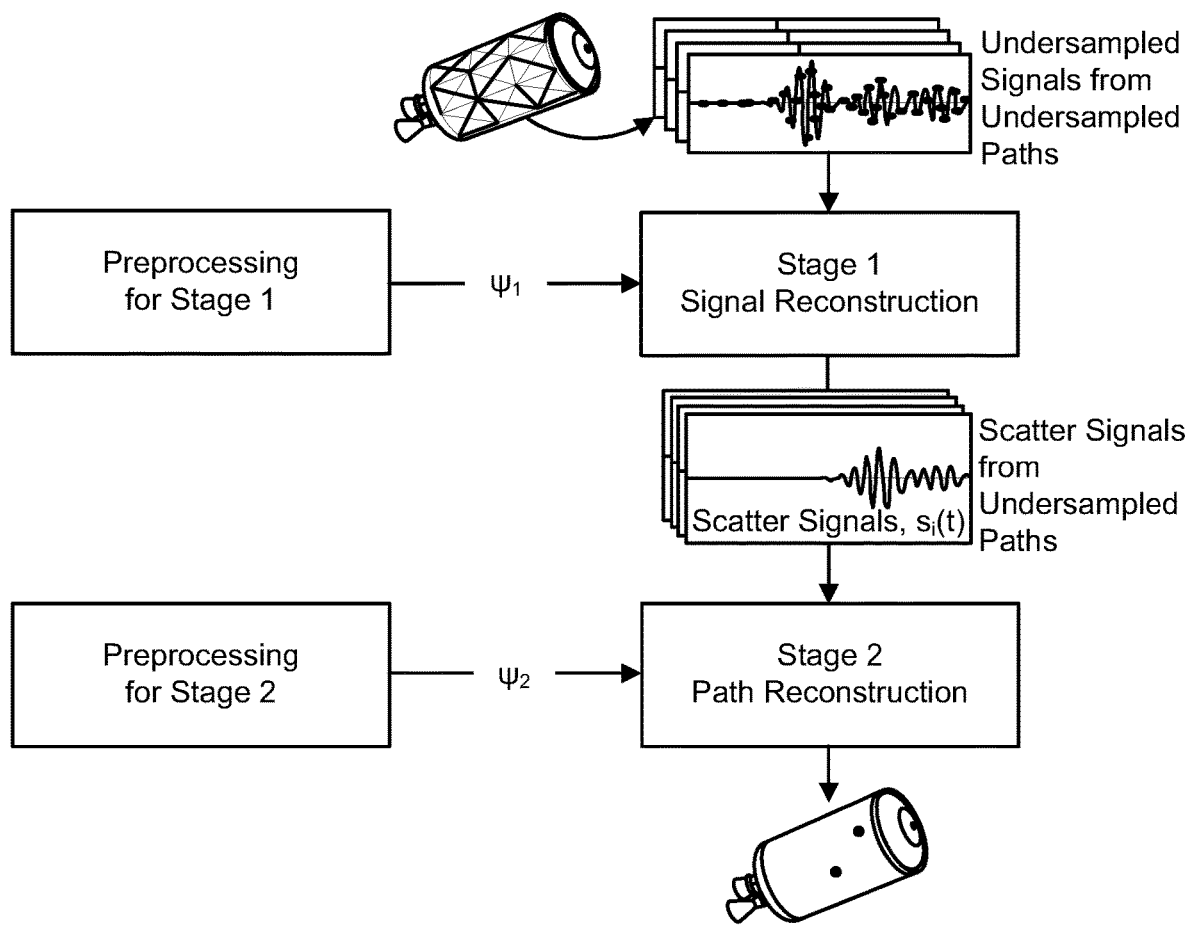
FIG. 23 shows software architecture design.

The complete software architecture, with inputs and outputs to each module, is shown in FIG. 23.

Functionality Testing/Demonstration

In this task, a composite structure was instrumented with sixteen piezoelectric sensors and used to test the algorithms and entire software package to demonstrate damage detectability using reduced sets of data. Damage detection results with various levels of downsampling were compared with that from the fully sampled case. In addition, a graphical user interface was developed to help guide and visualize the signal reconstruction process.

Functionality Testing

Figure 24:
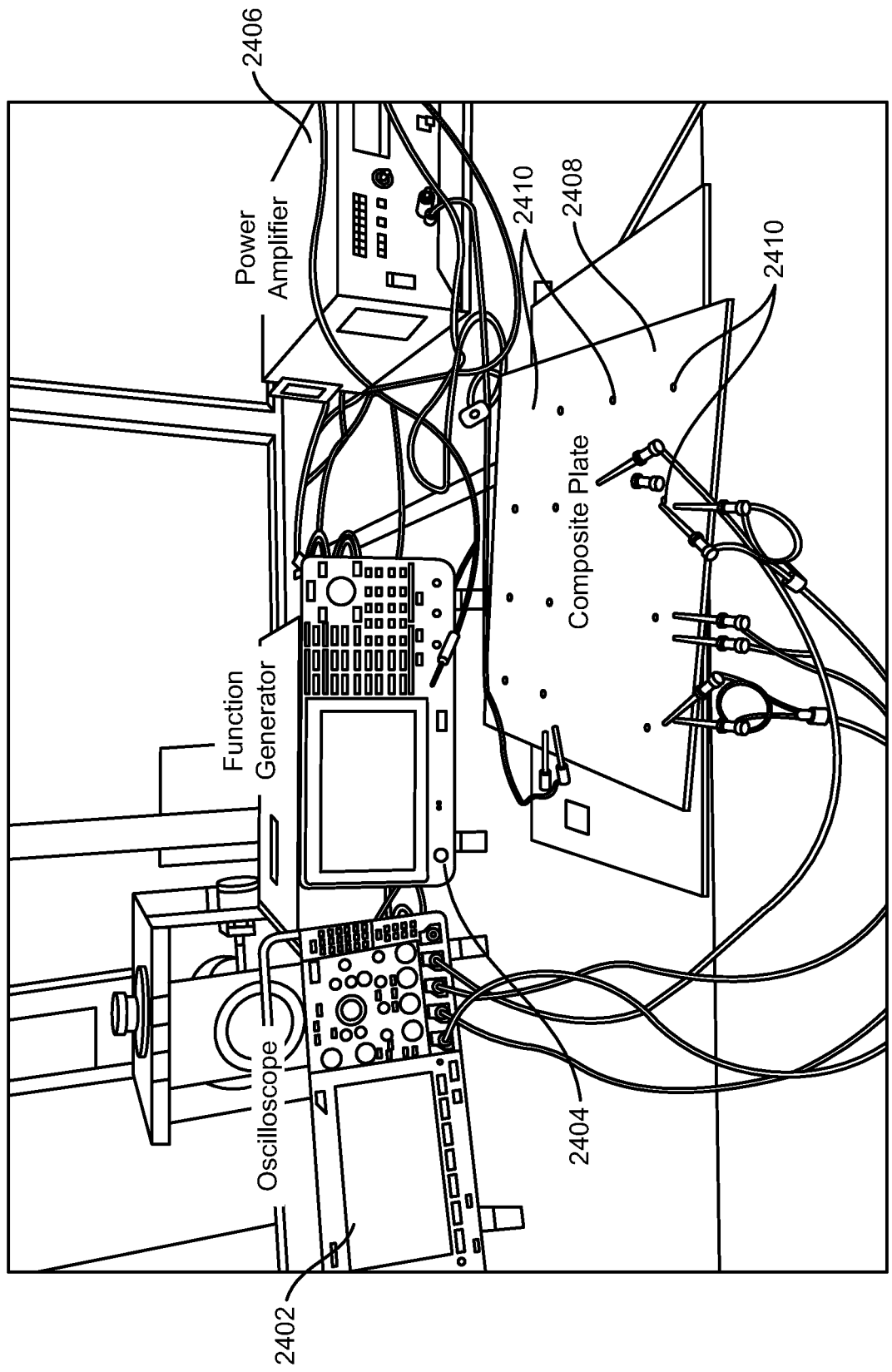
FIG. 24 show an experimental setup of the current disclosure.

The experimental setup is shown in FIG. 24, which includes oscilloscope 2402, function generator 2404, power amplifier 2406 and composite plate 2408. The sixteen piezoelectric transducers 2410 were attached in a square grid, and each are used as both an actuator and sensor to transmit and receive ultrasonic waves in a pitch-catch mode. A full set of healthy "baseline data" was collected from the 120 unique actuator-sensor paths, and the data and structural parameters were run through the Preprocessing for Stage 1 and Preprocessing for Stage 2 modules to generate the basis functions for Stages 1 and 2.

Figure 25:
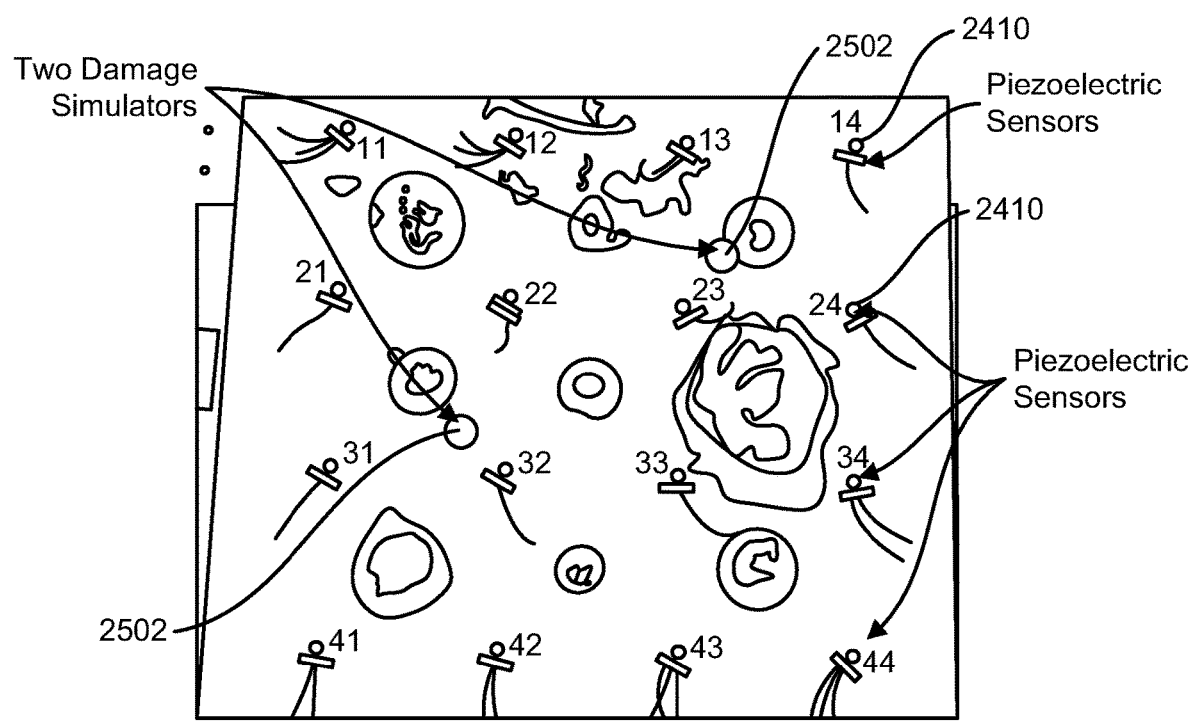
FIG. 25 shows damage simulators attached to composite structure.

Two damage simulators 2502 were then attached to the composite structure as shown in FIG. 25. The damage simulators are steel cylinders bonded to the surface of the structure. This causes a change in the local effective stiffness, which reflects, refracts, and diffracts propagating ultrasound waves, mimicking damage in the structure. Using damage simulators has the advantage of being able to run many scenarios with different damage sizes and locations, but all nondestructively.

Figure 26:
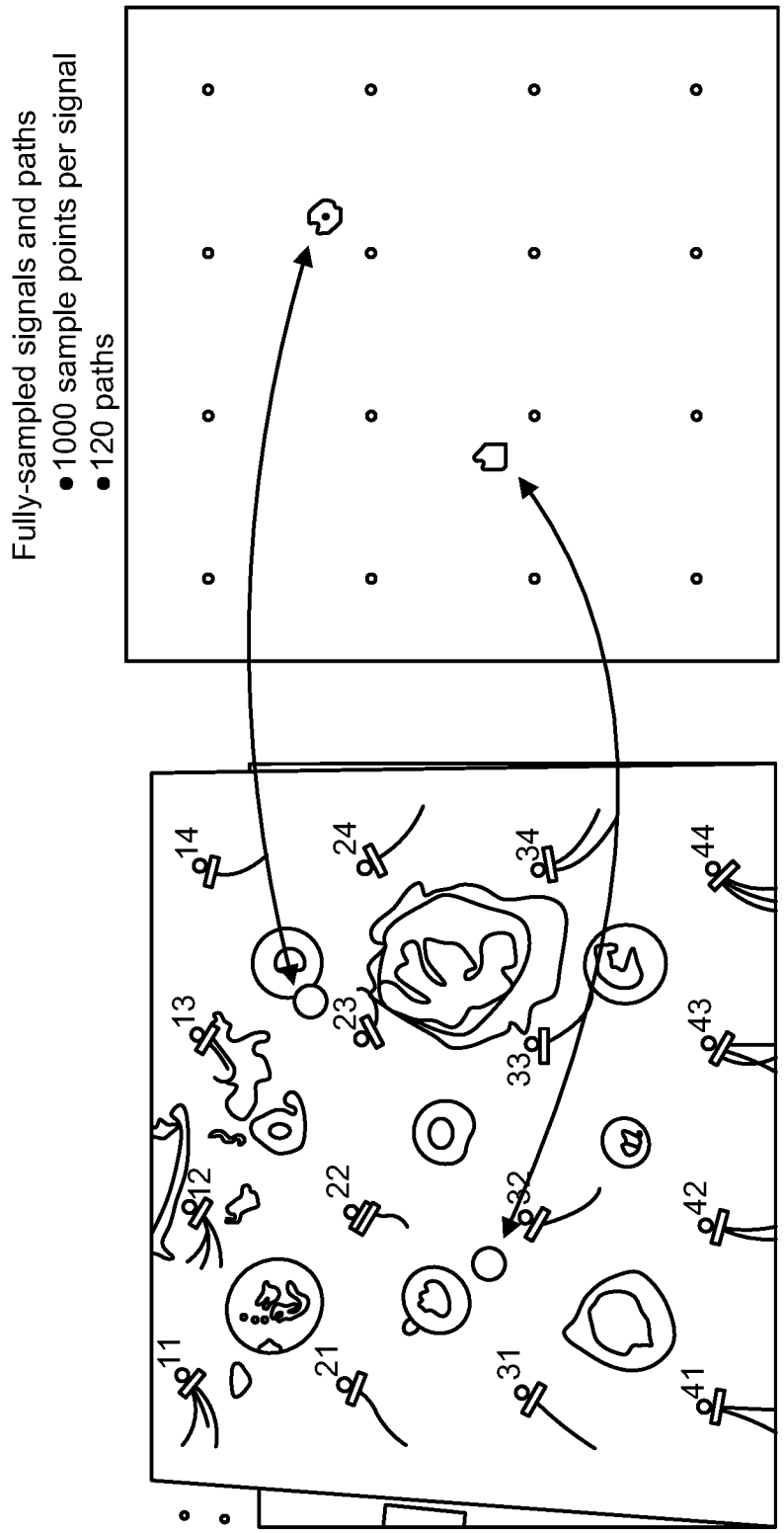
FIG. 26 shows diagnostic image from fully-sampled data.

With the damage simulators attached, a set of "current data" was collected from the structure and run through Stage 1 and Stage 2 to generate the diagnostic image from the fully-sampled signals (1000 points) and paths (120 paths) as shown in FIG. 26.

Next, 400 random signal points from 80 random actuator-sensor paths were sampled and run through Stages 1 and 2 to compare the diagnostic image from the undersampled data to that from the fully-sampled data (FIG. 27). As can be seen, there is some noise in the image from the undersampled data, but is still clear where the damage is located.

Figure 28:
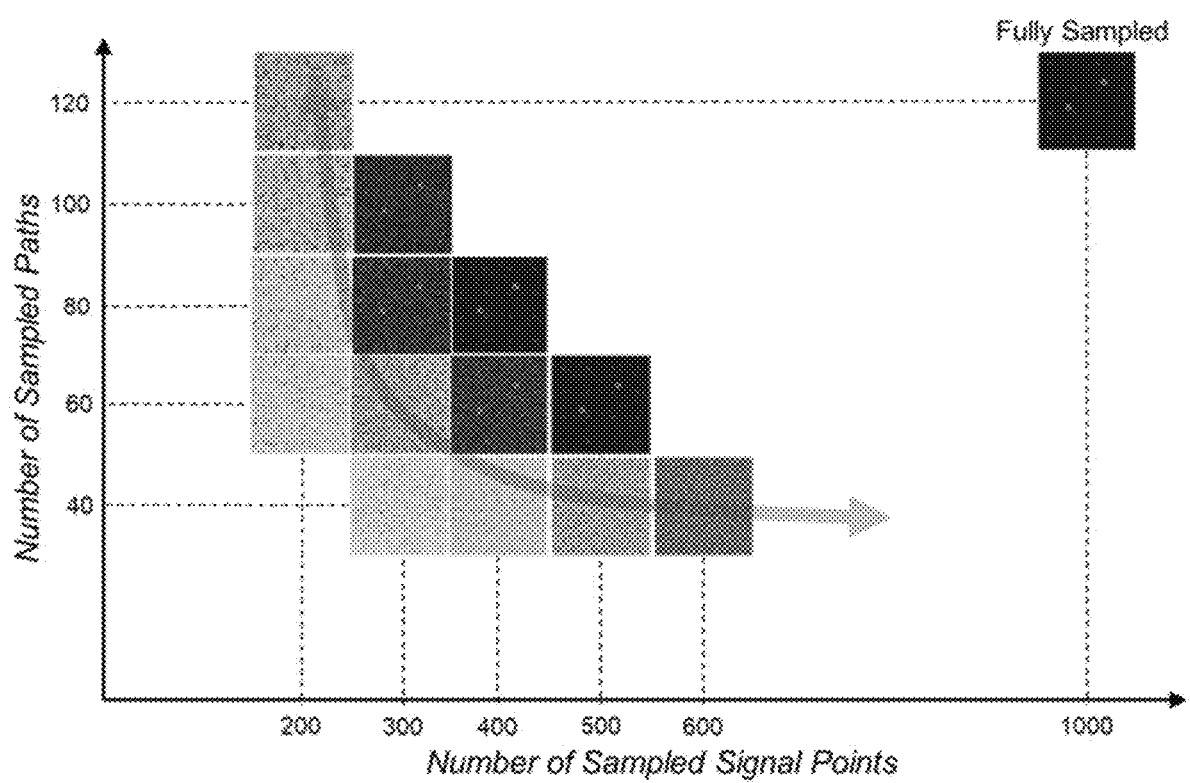
FIG. 28 shows a diagnostic images as a function of sampled points and paths.

A parametric study was conducted by varying the number of sampled signals points and number of sampled paths. The generated diagnostic images as a function of sampled points and paths are plotted in FIG. 28. The diagnostic images exhibit more noise as fewer sampled signals points and fewer sampled paths are used in the analysis. The red curved arrow delineates good diagnostic images from those that are too noisy to be used reliably. The images to the right and above the arrow are considered to be good, and the images to the left and below the arrow are considered to be too noisy.

Graphical User Interface

Figure 29:
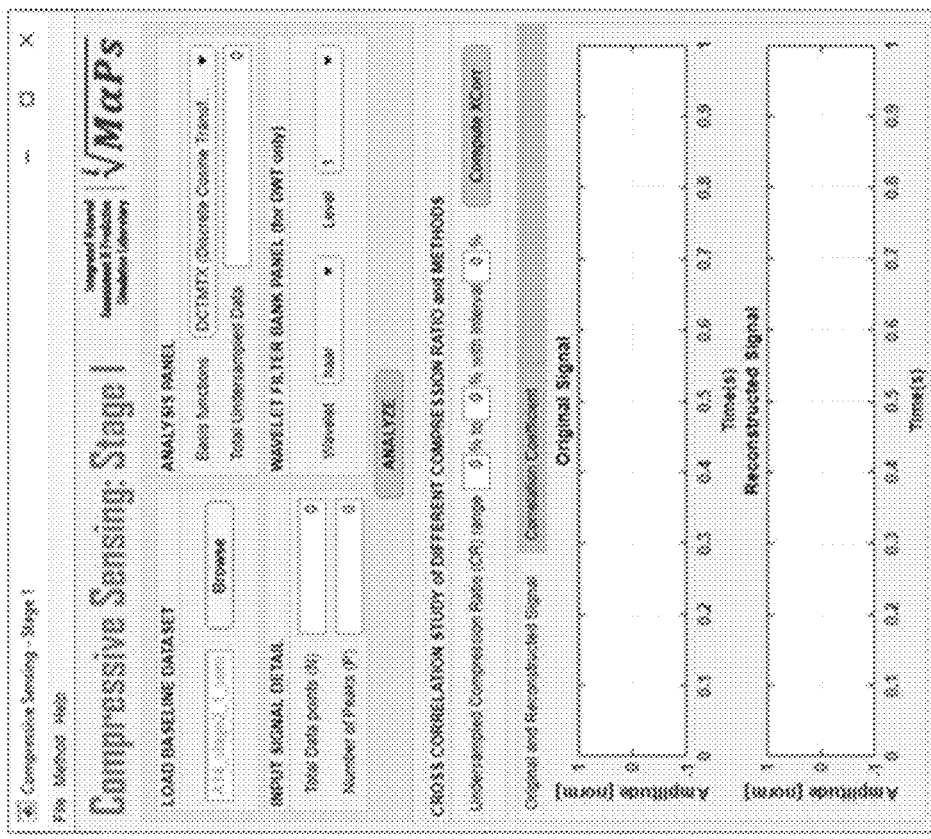
FIG. 29 shows graphical user interface for Stage 1 Signal Reconstruction.

To help guide and visualize the Stage 1 Signals Reconstruction process, a graphical user interface (GUI) was developed (FIG. 29). The GUI contains multiple analysis options for a variety of basis functions, and the user can visualize and quantify signal comparisons via cross correlation.

Figure 30:
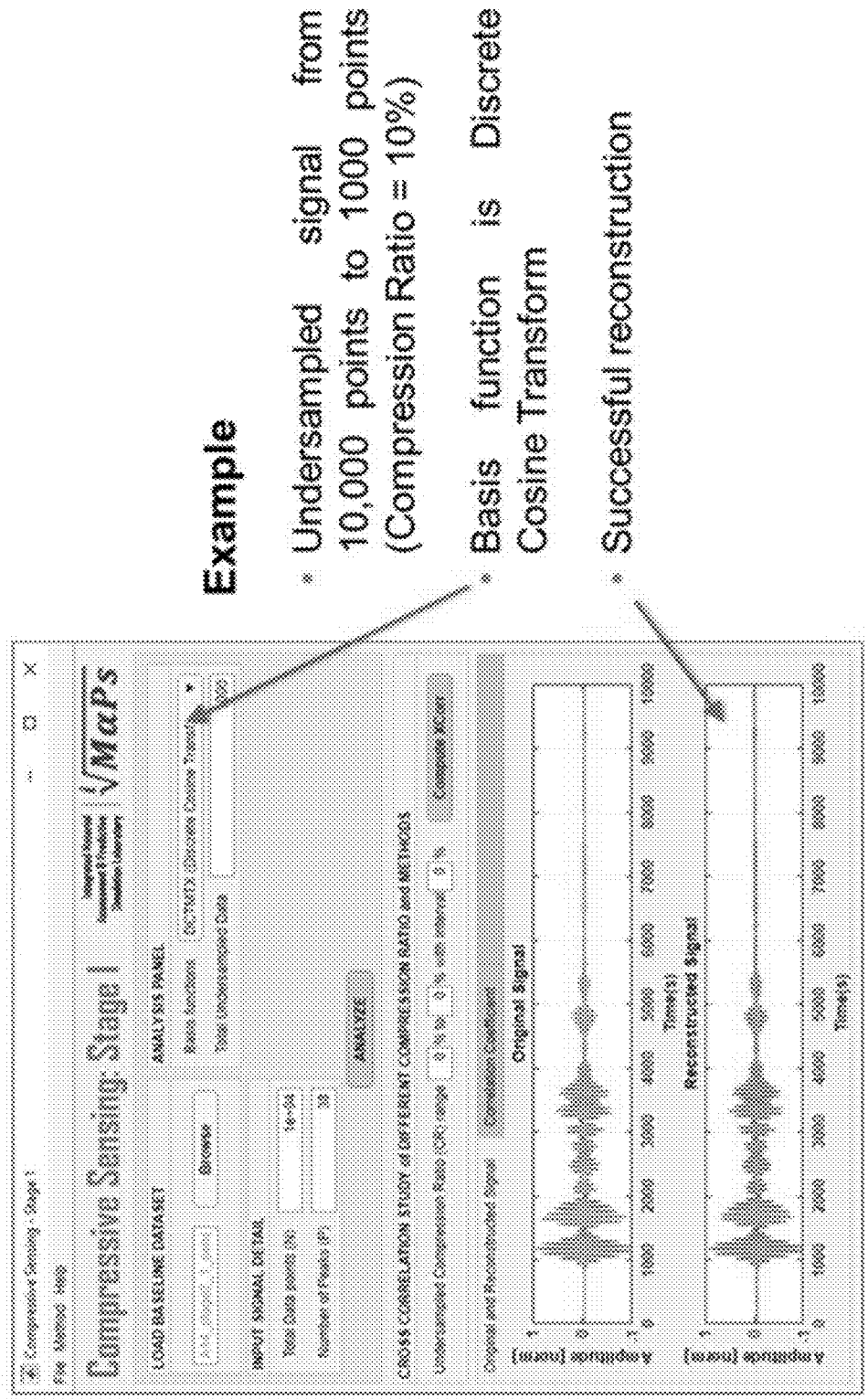
FIG. 30 shows an example signal reconstruction.

An example reconstruction is shown in FIG. 30, where a 10,000 point ultrasound signal has been randomly downsampled to 1000 points (compression ratio=10%) and then reconstructed using the Discrete Cosine Transform as the basis function. The fully-sampled signal and the reconstructed signal are shown in the lower window.

Figure 31:
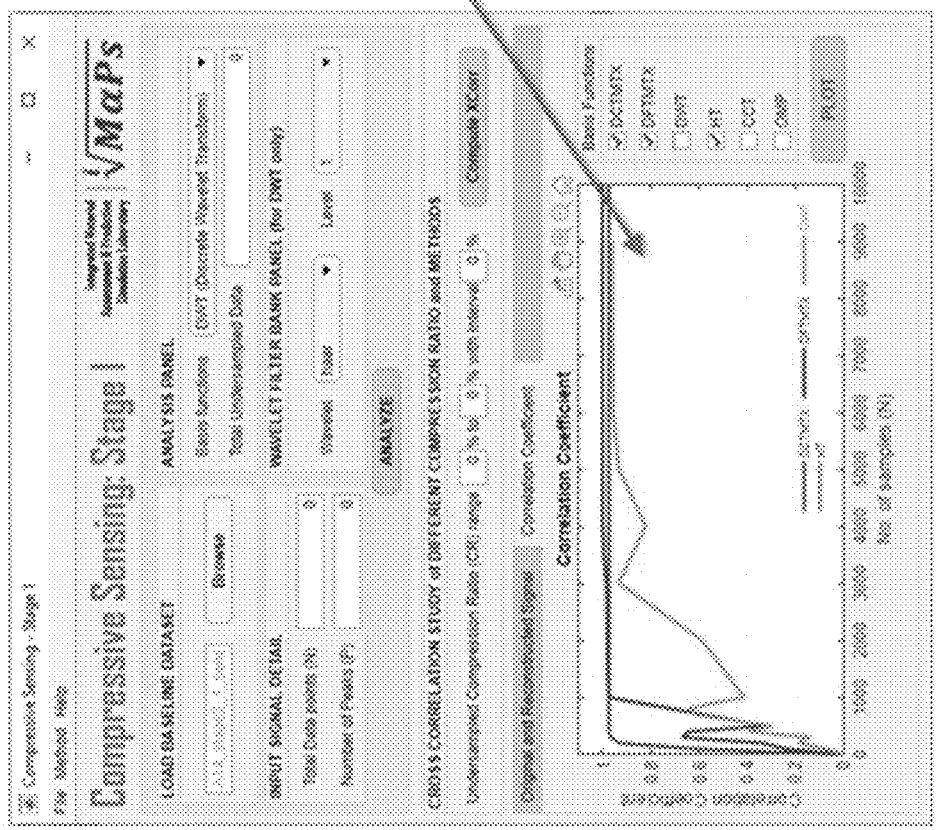
FIG. 31 shows an example of correlation coefficients.

The "Correlation Coefficient" tab displays a plot of the correlation coefficients to quantify reconstruction ability vs. sample points for all selected basis functions (FIG. 31).

This Phase I effort focused on developing Compressive Sensing algorithms and modules for automated reduction of NDE/SHM data from pitch-catch ultrasonic guided waves. The methodology uses Compressive Sensing at two stages in the data acquisition and analysis process to detect damage. The two stages are: (1) temporally undersampled sensor signals from (2) spatially undersampled sensor arrays, resulting in faster data acquisition and reduced data sets without any loss in damage detection ability.

Compressive Sensing algorithms and prototype software modules were developed for both stages to reconstruct undersampled sensor signals and reconstruct Damage Indices from undersampled actuator-sensor paths. Functionality testing and technical feasibility was successfully demonstrated on a composite structure using an array of piezoelectric sensors to generate diagnostic images from various levels of undersampled data.

Future Work and Potential Applications

While the Phase I focus was on reducing the data requirements for pitch-catch ultrasonic guided waves, the open system architecture design of the software is modular and scalable, allowing it to be extended to other NDE/SHM ultrasound techniques, such as pulse-echo, acoustic emission, shear wave, and impact detection. The focus of the Phase II effort will be to expand the modules to include other NDE/SHM ultrasound inspection and diagnostic techniques, develop interfaces to prognostic models, conduct comprehensive software verification and validation testing, and develop hardware specifications and designs to take advantage of the Compressive Sensing software to minimize weight and reduce the number sensors needed for accurate damage detection. The goal will be to turn this concept into a commercially viable product that will be available for widespread trial and adaptation at the end of the Phase II project.

Specifically, in Phase II, Advent will:

Develop and integrate modules for pulse-echo, acoustic emission, shear wave, and impact detection.

Collaborate with NASA and OEMs to evaluate and refine the software package. Incorporate feedback on the operation and usability from end users.

Conduct comprehensive verification and validation of the technology across a variety of large complex space structures.

Develop hardware specifications to take advantage of the Compressive Sensing software to reduce data acquisition requirements compared to conventional systems.

Conduct study to quantify the reduction in energy consumption, number of sensors, data acquisition and storage requirements, and total system weight resulting from the use of Compressive Sensing.

In collaboration with NASA and industrial partners, develop an implementation and technology transfer plan for incorporating the system into their sustained maintenance planning.

In the Phase III effort, Advent will assist in transitioning the system to NASA and provide support in system integration and qualification testing of the software technology. The technology can potentially be tested and used in the Combined Loads Test System (COLTS) facility at NASA Langley Research Center to help reduce sensor data acquisition and processing burdens.

It is anticipated that the first application of the technology will be the integration into NASA's inspection tools for large complex space structures made with composites or thin metals, such as the Orion crew module, Space Launch System, and the Lunar Outpost Platform-Gateway. As NASA continues to direct efforts into deep space flight, smart structures that are instrumented with SHM systems will be needed to provide real time mission critical information of the structure's status. In order for these SHM systems to be viable, the total number of sensors, total weight, and data acquisition requirements must be minimized, and Advent's Compressive Sensing software will be critical in achieving this.

Figure 32:
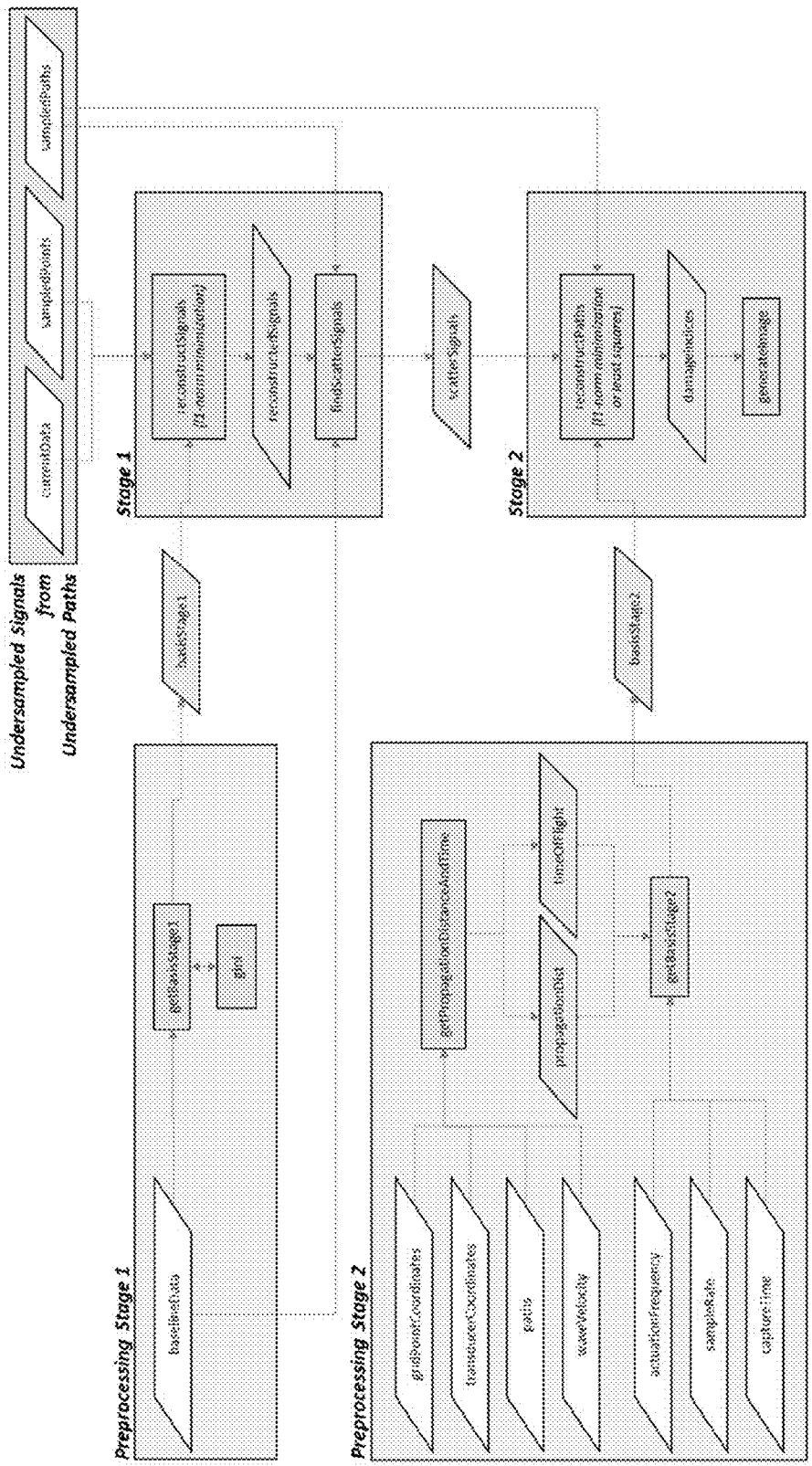
FIG. 32 shows a flowchart of internal algorithms, as well as detailed inputs and outputs of each of the modules of the current disclosure.

Internal algorithms, as well as detailed inputs and outputs of each of the modules, are shown in the flowchart in FIG. 32. In the flowchart, the white parallelograms are input data/parameters. The green parallelograms are internal parameters that get passed between functions, and the functions are the blue boxes.

Novel features of the innovation include: (1) the ability to generate basis functions needed for Compressive Sensing, (2) the ability to reconstruct temporally undersampled sensor signals, (3) the ability to reconstruct parameters from spatially undersampled actuator-sensor paths, and (4) the ability to generate diagnostic images from the reconstructed data. The advantages of the innovation are the reduction in data acquisition processes and storage, and the potential to reduce the number of required sensors and total weight of NDE/SHM systems.

Refined and Expanded Software Architecture

The focus of the Phase I effort was on developing an open system architecture (OSA) software design for reconstruction of undersampled NDE/SHM data from pitch-catch ultrasonic guided waves. Advent designed the software architecture to be flexible and reconfigurable to facilitate rapid module development, simplify module verification and validation, and allow for efficient upgrades to the system. While the Phase I focus was on reducing the data requirements for pitch-catch ultrasonic guided waves, the OSA software design allows it to be extended to other NDE/SHM techniques. In Phase II, Advent is building upon the modular software architecture design and expanding it to include other NDE/SHM techniques. The existing code is being refined and streamlined to optimize Stage 1 and Stage 2 computation of large data sets, and additional modules are being added to include data reconstruction capabilities for pulse-echo (A-scan), C-scan, acoustic emission, impact data, thermography, and Terahertz scanning data.

The software architecture developed in Phase I is comprised of four separate modules, consisting of two preprocessing modules and two reconstruction modules, see FIG. 2.

Stage 1 uses CS to reconstruct undersampled pitch-catch ultrasound signals (undersampled in time), and Stage 2 uses CS to reconstruct data from missing actuator-sensor paths (undersampled in space). But not all NDE/SHM methods will generate data that can be undersampled in both time and space. Therefore, to generalize the architecture to accommodate other types of NDE/SHM methods, the stages have been redefined to be Stage 1 Temporal Reconstruction and Stage 2 Spatial Reconstruction. Also, the NDE/SHM dataflow has been designed to distinguish between datasets that have been undersampled in both time and space from those that have been undersampled in either time or space, see FIG. 33 For example, data that has been undersampled in both space and time (e.g. the pitch-catch data from Phase I) will flow through both Stage 1 and Stage 2 as shown by the blue arrows in FIG. 33. Whereas, NDE data that has been undersampled in time only (e.g. pulse-echo/A-scan or acoustic emission data) will just flow through Stage 1 to reconstruct the signals as shown by the red arrows. Similarly, data that has been undersampled in space only (e.g. C-scan data) will bypass Stage 1 and go directly to Stage 2 to reconstruct the data for imaging as shown by the green arrows. The Preprocessing modules for Stage 1 and Stage 2 are intended to be run only once for each application. Their purpose is to determine the best basis functions to use for a particular type of NDE/SHM data to accurately reconstruct the data in time (Stage 1) and/or space (Stage 2).

Methodology to Determine Probability-of-Detection as a Function of Compression-Ratio In Phase I, signal reconstruction ability was quantified through correlation coefficients, but the damage detection ability was evaluated qualitatively through diagnostic images. In Phase II, Advent is developing a methodology to generate probability-of-detection (POD) curves as a function of Compression Ratio (CR) to quantify accuracy of damage detection from undersampled data. Here, CR is defined as $$CR = \frac{m \times k}{N \times P}$$

where in is the number of temporally undersampled signal points, N is the full signal length, k is the number of spatially undersampled sensors (or image pixels), and P is the number of sensors (or image pixels) in a fully populated sensor array (or diagnostic image). Note that CR=1 for fully sampled data and less than 1 for undersampled data in both time and space.

POD is a popular metric used to quantify the damage detection capability of NDE/SHM systems and is defined as the probability that a given damage will be detected using a given inspection method. In practice, no NDE/SHM method provides 100% assurance on the damage size that is possible to detect because there is statistical uncertainty in all measurements due to the number of specimens tested, operator experience, damage characteristics, structural material/geometry, environmental changes, etc. Therefore, NDE/SHM reliability is typically expressed in terms of damage size that has a 90% POD with 95% confidence, after taking into account all variables that can affect detection.

Figure 34:
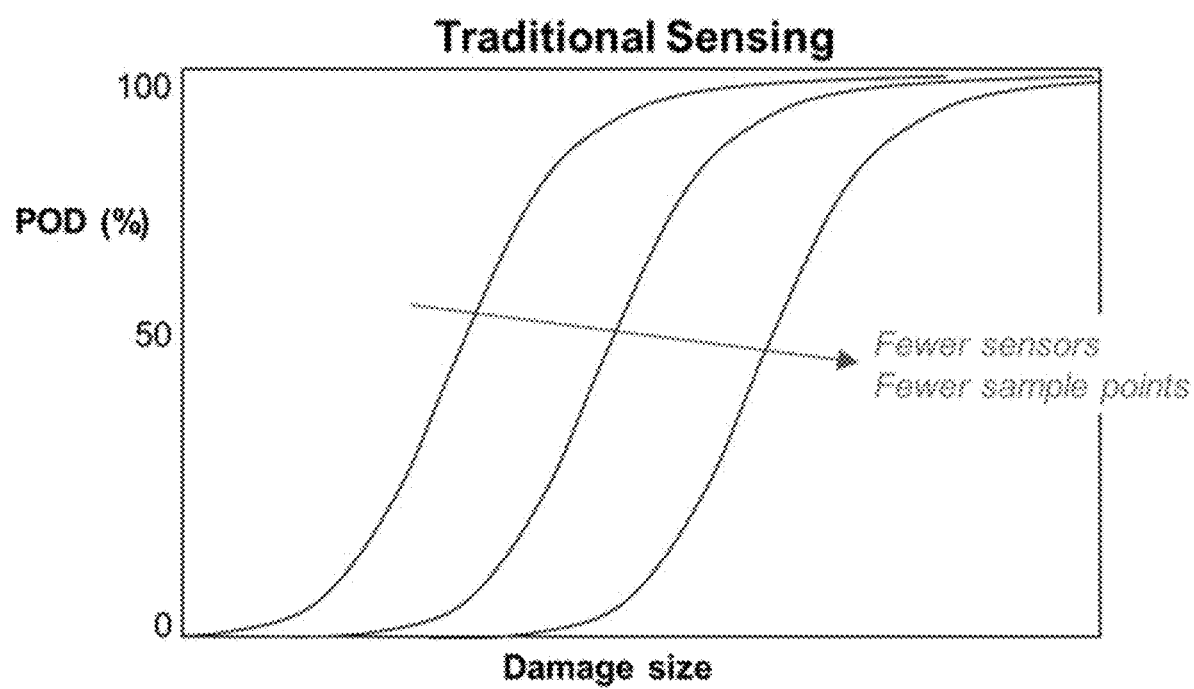
FIG. 34 shows POD curves for traditional sensing shift to the right when fewer measurements are used.
Figure 35:
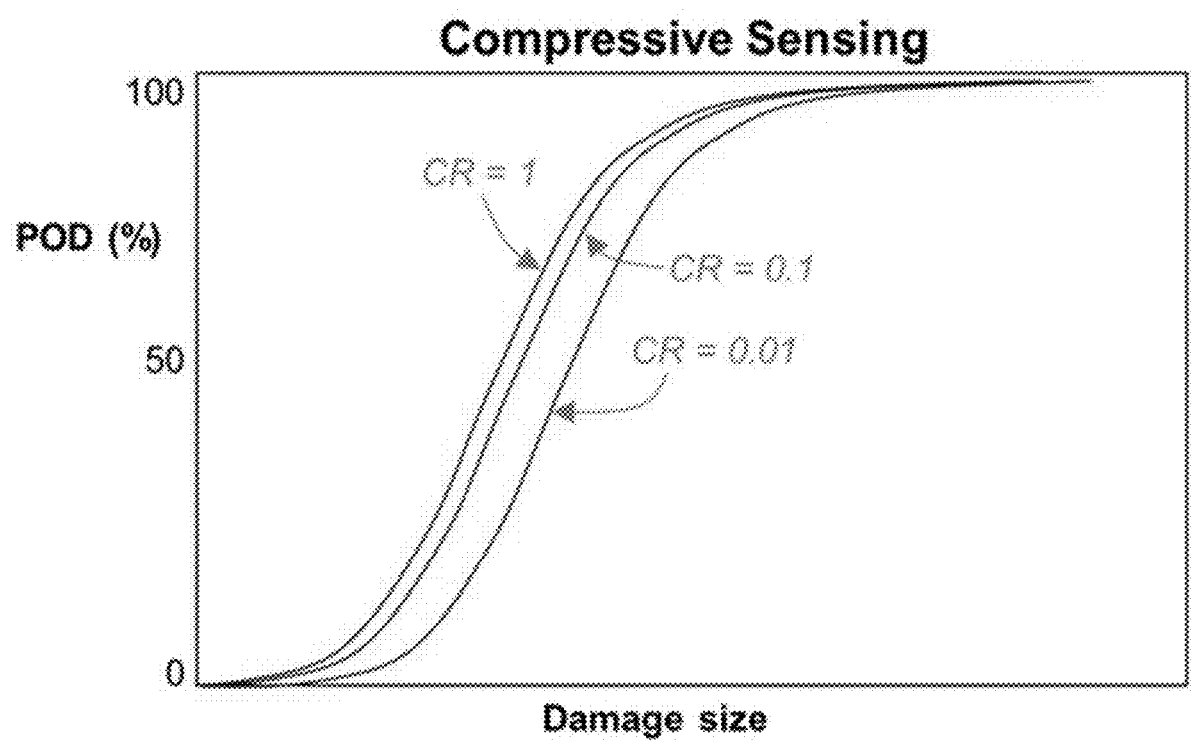
FIG. 35 shows POD curves for compressive sensing move back toward the fully sampled case.

In traditional sensing, as opposed to compressive sensing, using fewer sensors or fewer sample points per measurement tends to shift the POD curves to the right as shown in FIG. 34. But as was found in the Phase I study, the use of CS to reconstruct the undersampled data can restore the damage detection capabilities, which will move the POD curves back toward the fully sampled cases (FIG. 35).

In this methodology, POD curves will be generated to quantify the damage detection capability as a function of CR. Rather than conducting a full-blown POD experimental study for different damage types and different NDE/SHM methods, sensor data from previous POD studies will be used. Data from previous POD experimental studies on metals and composites will be downsampled and used as input into the software package. Damage detection results with various levels of CR will be compared with those from fully sampled experiments, and POD curves will be generated.

Methodology to Quantify Benefits of Compressive Sensing for NDE/SHM Applications Advent is developing a methodology to quantify the benefits that the CS approach can provide for NDE/SHM of large structures. The savings will be quantified in terms of: (1) data acquisition time, (2) data storage space, (3) reduction in number of required sensors, and (4) total weight of NDE/SHM systems. These quantified savings will, in turn, be related to the POD curves developed above. The purpose is to give end users the ability to make informed decisions for new applications regarding number of sensors (or total NDE/SHM system weight) for a given critical damage size and associated POD.

Figure 36:
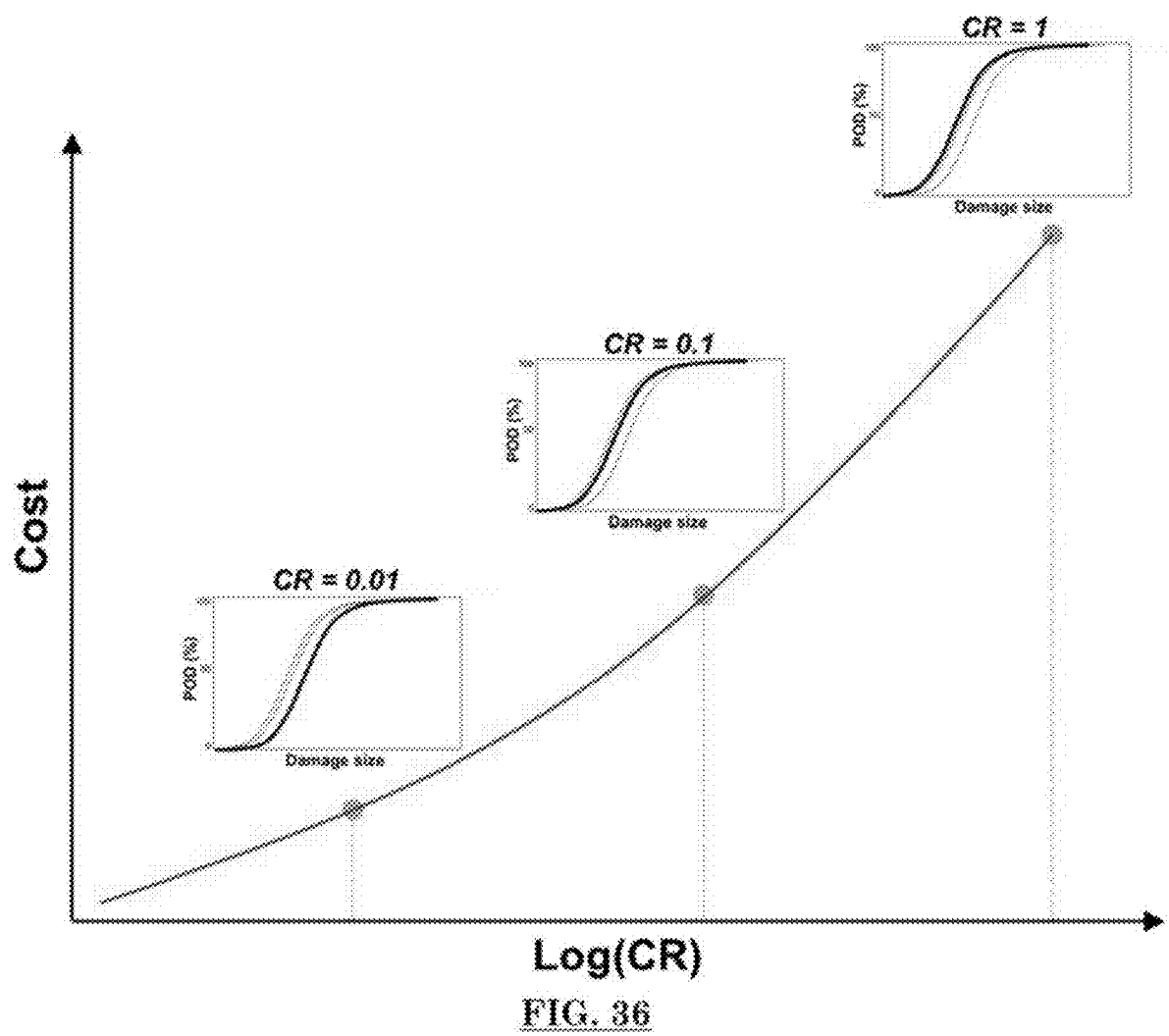
FIG. 36 shows quantified savings versus CR and POD.

An example relationship between cost, compression ratio, and POD is shown in FIG. 36. Here, cost could be data acquisition time, data storage space, number of sensors, total NDE/SHM system weight, or a combination of all of the above. Each point on the curve corresponds to a particular CR, which corresponds to a particular POD curve.

Refined and Expanded Software Architecture with Example

The initial methodology for application to ultrasonic guided waves was broken down into four modules as shown in the diagram in FIG. 2. The preprocessing modules are intended to be run only once in order to generate the basis functions required for the Compressive Sensing algorithms that are housed in the Stage 1 and Stage 2 modules. The Stage 1 Signal Reconstruction module contains Compressive Sensing algorithms to enable reconstruction of temporally undersampled sensor signals. The Stage 2 Path Reconstruction module contains Compressive Sensing algorithms for reconstruction of spatially undersampled actuator-sensor paths.

While the initial Compressive Sensing methodology was focused on reducing the data requirements for pitch-catch ultrasonic guided waves, the software architecture design allows it to be extended to other NDE/SHM techniques. Advent has built upon the modular software architecture design and expanded it to include other NDE/SHM techniques.

Figure 33:
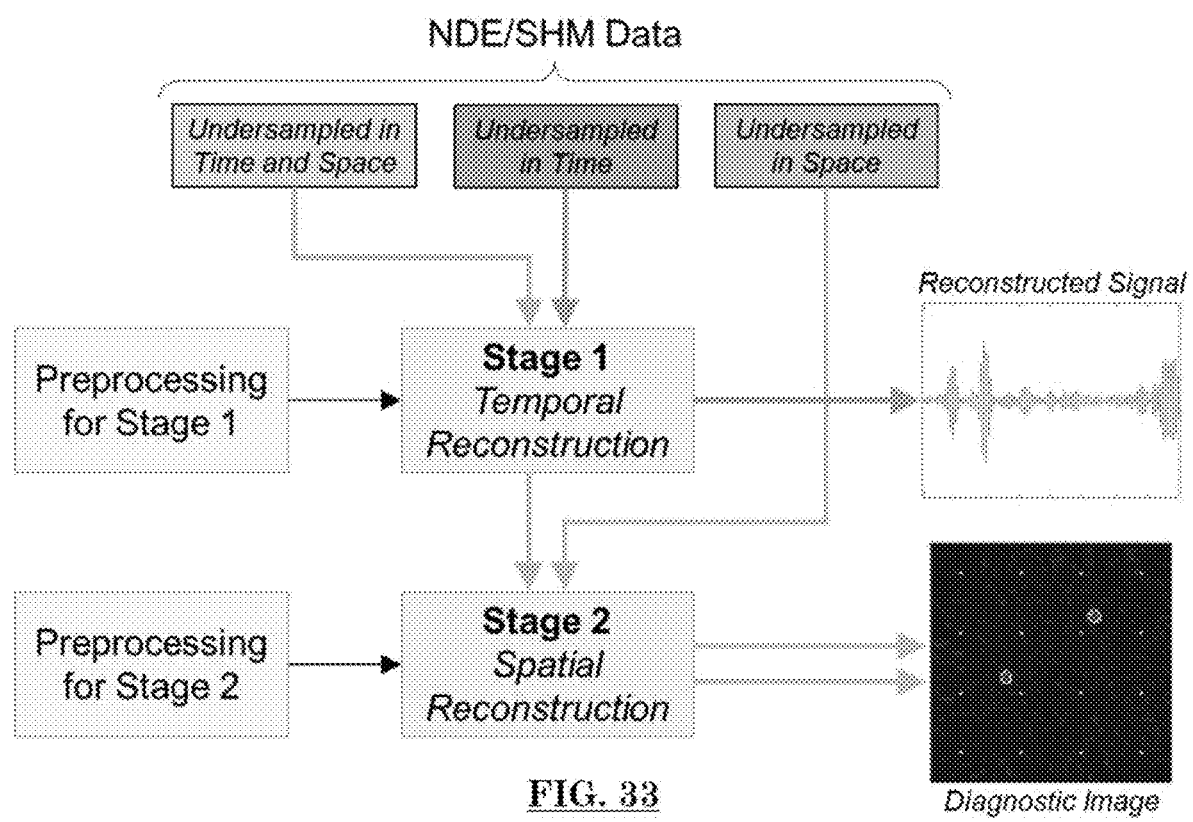
FIG. 33 shows one embodiment of a refined and generalized software architecture design of the current disclosure.

Not all NDE/SHM methods will generate data that can be undersampled in both time and space. Therefore, to generalize the architecture to accommodate other types of NDE/SHM methods, the stages have been redefined to be Stage 1 Temporal Reconstruction and Stage 2 Spatial Reconstruction. Also, the NDE/SHM dataflow has been designed to distinguish between datasets that have been undersampled in both time and space from those that have been undersampled in either time or space (FIG. 33). For example, data that has been undersampled in both space and time (e.g. the pitch-catch data) will flow through both Stage 1 and Stage 2 as shown by the blue arrows in the figure. NDE data that has been undersampled in time only (e.g. pulse-echo/A-scan or acoustic emission data) will just flow through Stage 1 to reconstruct the signals as shown by the red arrows. Similarly, data that has been undersampled in space only (e.g. C-scan data) will bypass Stage 1 and go directly to Stage 2 to reconstruct the data for imaging as shown by the green arrows.

The architecture and methodologies enable data reconstruction capabilities for various NDE/SHM techniques, including pitch-catch ultrasonic guided waves, pulse-echo (A-scan), B-scan, C-scan, Z-scan, acoustic emission, impact data, thermography, etc.

As before, the Preprocessing modules for Stage 1 and Stage 2 are intended to be run only once for each application. Their purpose is to determine the best basis functions to use for a particular type of NDE/SHM data to accurately reconstruct the data in time (Stage 1) and/or space (Stage 2).

Example Using A-Scan and C-Scan Data

Figure 37A:
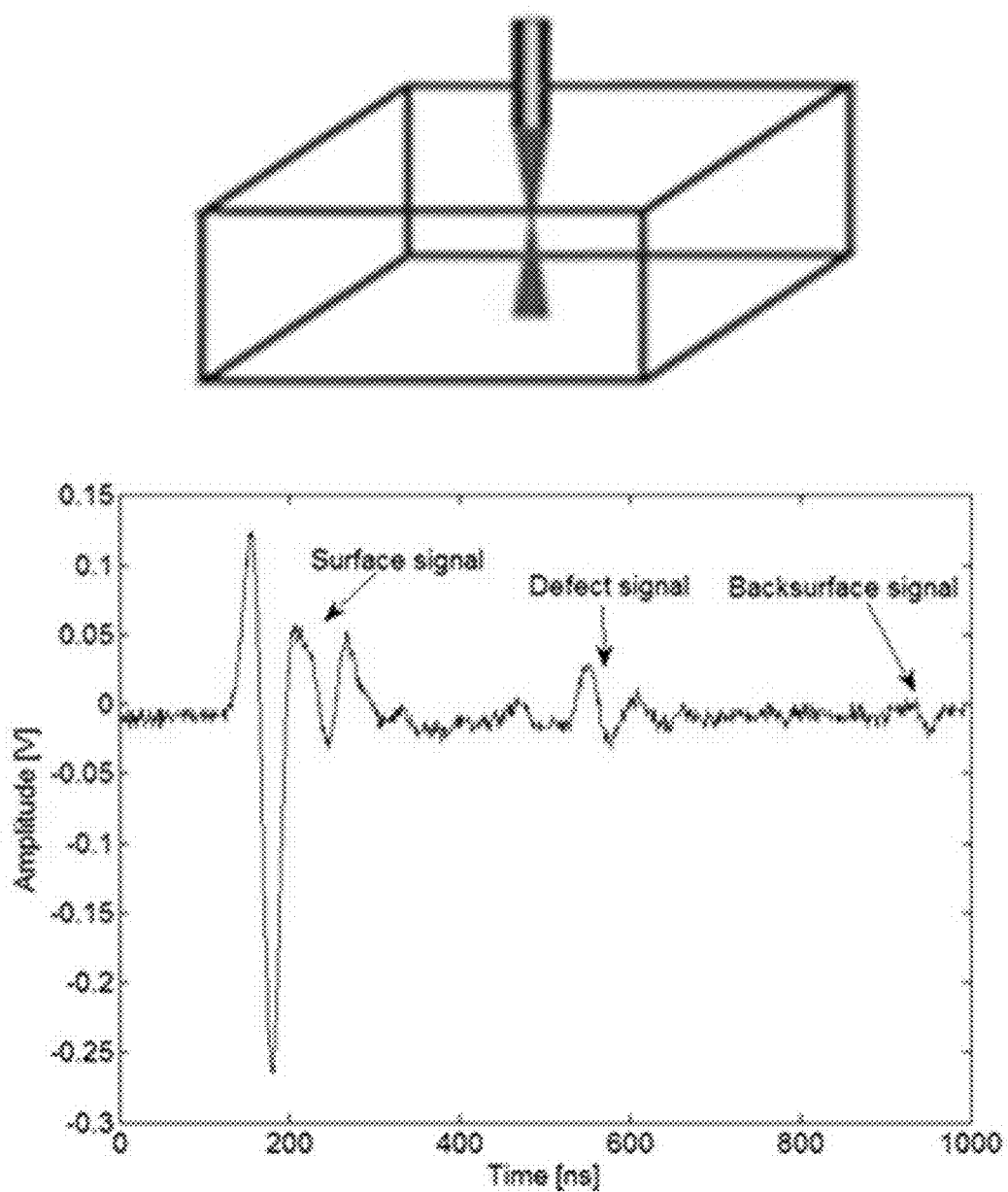
FIG. 37A shows a graph of A scan data.

Previously, reconstruction of undersampled A-scan data and undersampled C-scan data was done separately, following the red and green arrows in FIG. 33, respectively. The A-scan data is an ultrasonic pulse-echo signal (amplitude vs. time) from a single point, while the C-scan data is a 2-D image created by all the points where an A-scan signal was collected (FIG. 37A). In other words, each A-scan signal represents one pixel in the C-scan image (FIG. 37B). This example follows the blue arrows in FIG. 33 by first reconstructing undersampled A-scan data to obtain pixel information, and then reconstructing a 2D C-scan image that has missing pixels (missing A-scan data).

The data was obtained using USC's customized PVA TePLA SAM 300, which has an operating frequency range of 5-400 MHz. After defining the scanning areas and the central frequency, the machine discretizes the material domain into pixel points. Then an A-scan signal from every pixel point is acquired.

Figure 38:
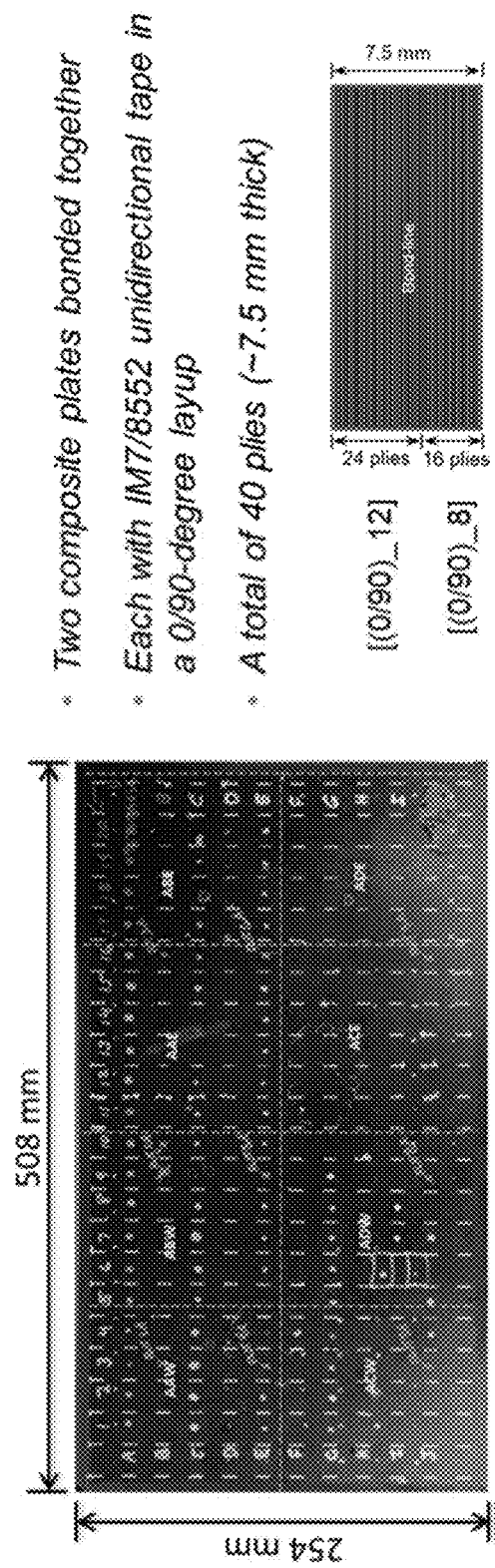
FIG. 38 shows a composite plate geometry and dimensions.

A comprehensive parametric study was conducted to generate C-scan images using various combinations of compression ratios for the A-scan data (undersampled in time) and C-scan data (undersampled in space), and to quantify the reconstructions using correlation coefficients and probability-of-detection. A composite plate was fabricated from two 254 mm by 508 mm coupons, each with IM7/8552 unidirectional tape in a 0/90-degree layup. The plate consists of a total of 40 plies (approximately 7.5 mm thick), with the top sheet having 24 plies [(0/90)_12] and the bottom sheet having 16 plies [(0/90)_8] as shown in FIG. 38. The two coupons were bonded together using FM-300 adhesive.

For convenience, the plate was divided into 8 different regions, naming AAW, ABW, ACW, ADW, AAE, ABE, ACE, and ADE. Each of these regions were further subdivided into a 5×5 grid, with each grid measuring approximately 25 mm×25 mm. Each grid segment can be identified by its row and column (e.g., row A and column 1).

Figure 39:
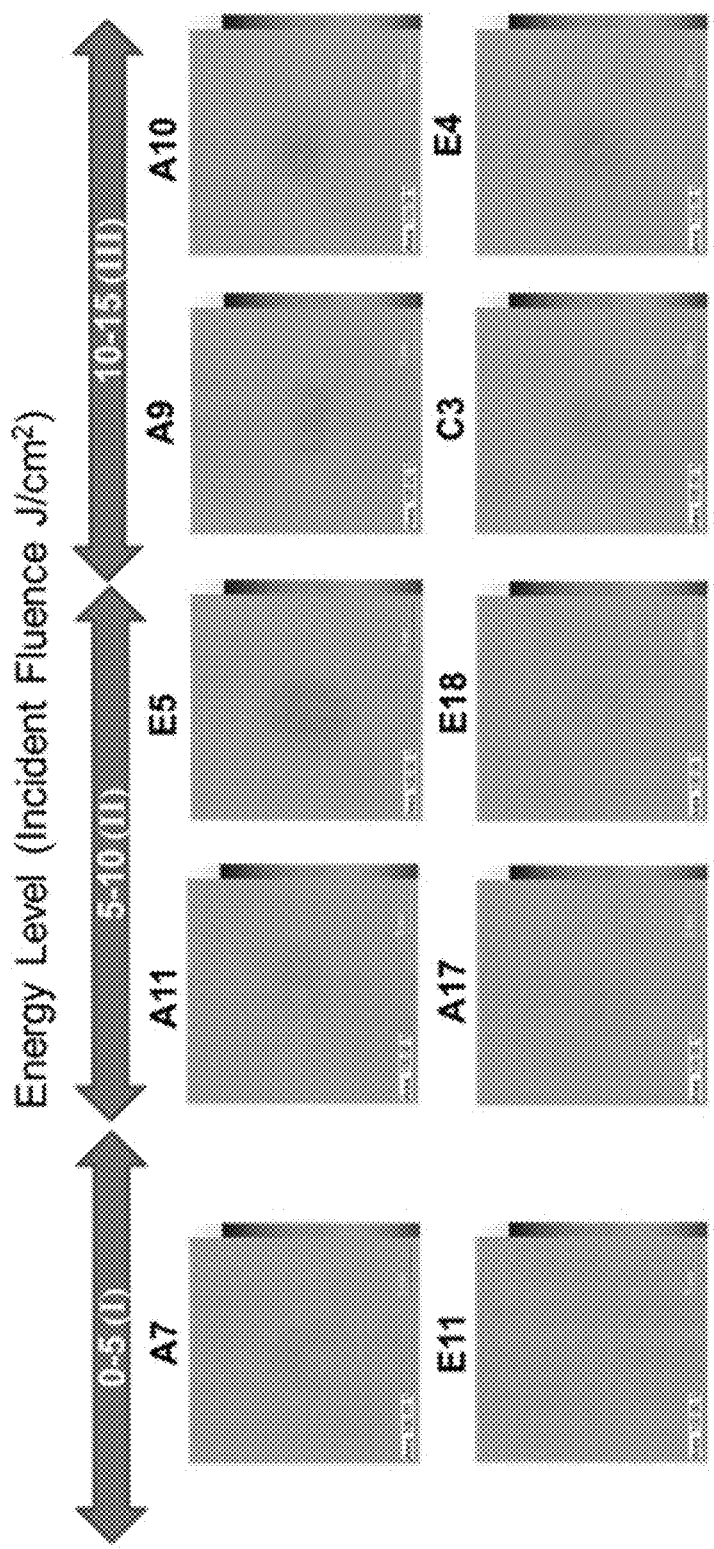
FIG. 39 shows a C-scan through-transmission image after LBI.

Laser Bond Inspection (LBI) was applied at each grid point with different incident fluence energies to induce local debonds/delaminations of different sizes. Images of several sample different grid regions and the applied incident fluence energies are shown in FIG. 39. In general, the severity of the debonds/delaminations increase with the applied incident fluence energy.

Figure 40:
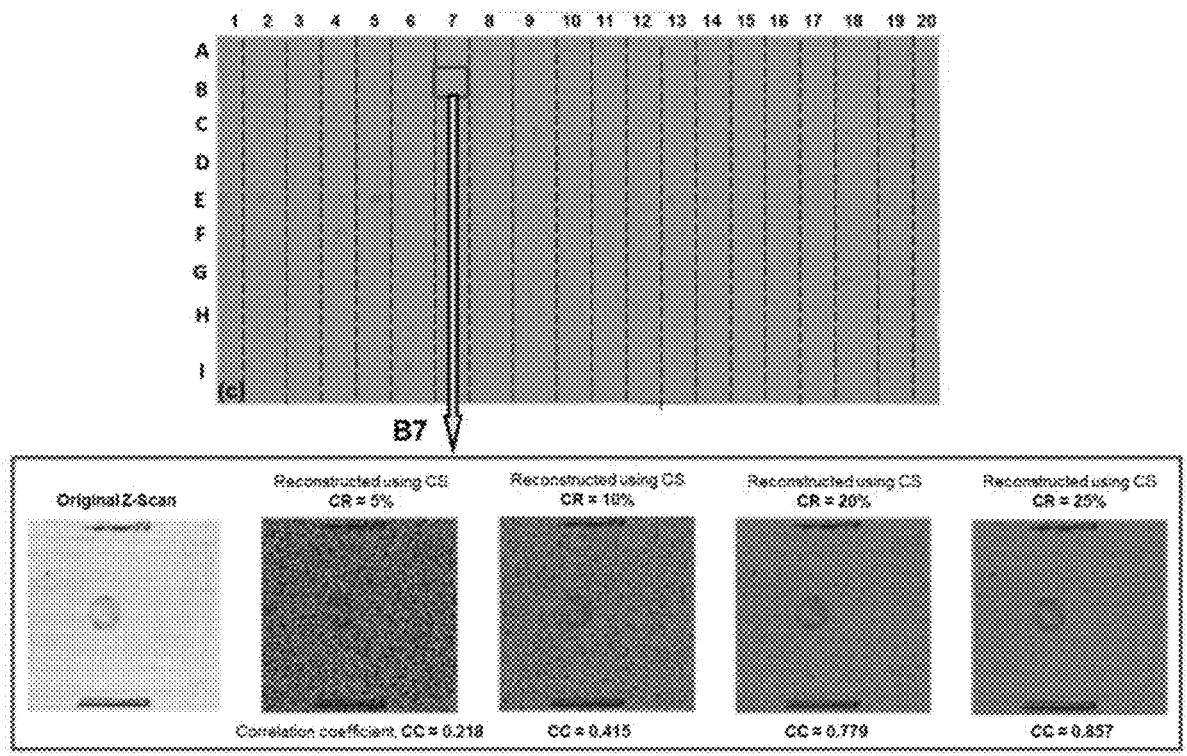
FIG. 40 shows an image using Z-scan pulse-echo data at the bondline.

A full 3D Z-scan was performed using SAM with a 25 MHz transducer, and a C-scan image was generated at the bondline (FIG. 40). Data from grid region B7 was downsampled and then reconstructed using compressive sensing. The grid region is 125-pixels×125-pixels, for a total of 15,625 pixels. Each pixel contains a time-domain signal vector that is 76,001 sample points in length. These time-domain signals were initially reduced to 15,000 sample points by taking only the portion between the top surface and bottom surface reflections. The 15,000-point vectors were then randomly downsampled to various compression ratios. Initial analysis was conducted using 750, 1500, 3000, and 3750 sample points for compression ratios (CR) of 5%, 10%, 20%, and 25%, respectively. The undersampled signals were then reconstructed using the Discrete Cosine Transform as a basis function, and the images were regenerated as shown in FIG. 40. The respective correlation coefficients (CC) were 0.218, 0.415, 0.779, and 0.857. The LBI-induced debond/delamination can be seen at a CR of 10% and CC of 0.415 but is much clearer at a CR of 20% when the CC is above 0.7.

The above initial image reconstructions included low compression ratios in the A-scan data, but were spatially fully sampled (all of the pixels) for the image reconstruction.

A comprehensive set of cases were then run for various combinations of compression ratios for both the A-scan data and C-scan/Z-scan data (randomly undersampled pixels).

Figure 41:
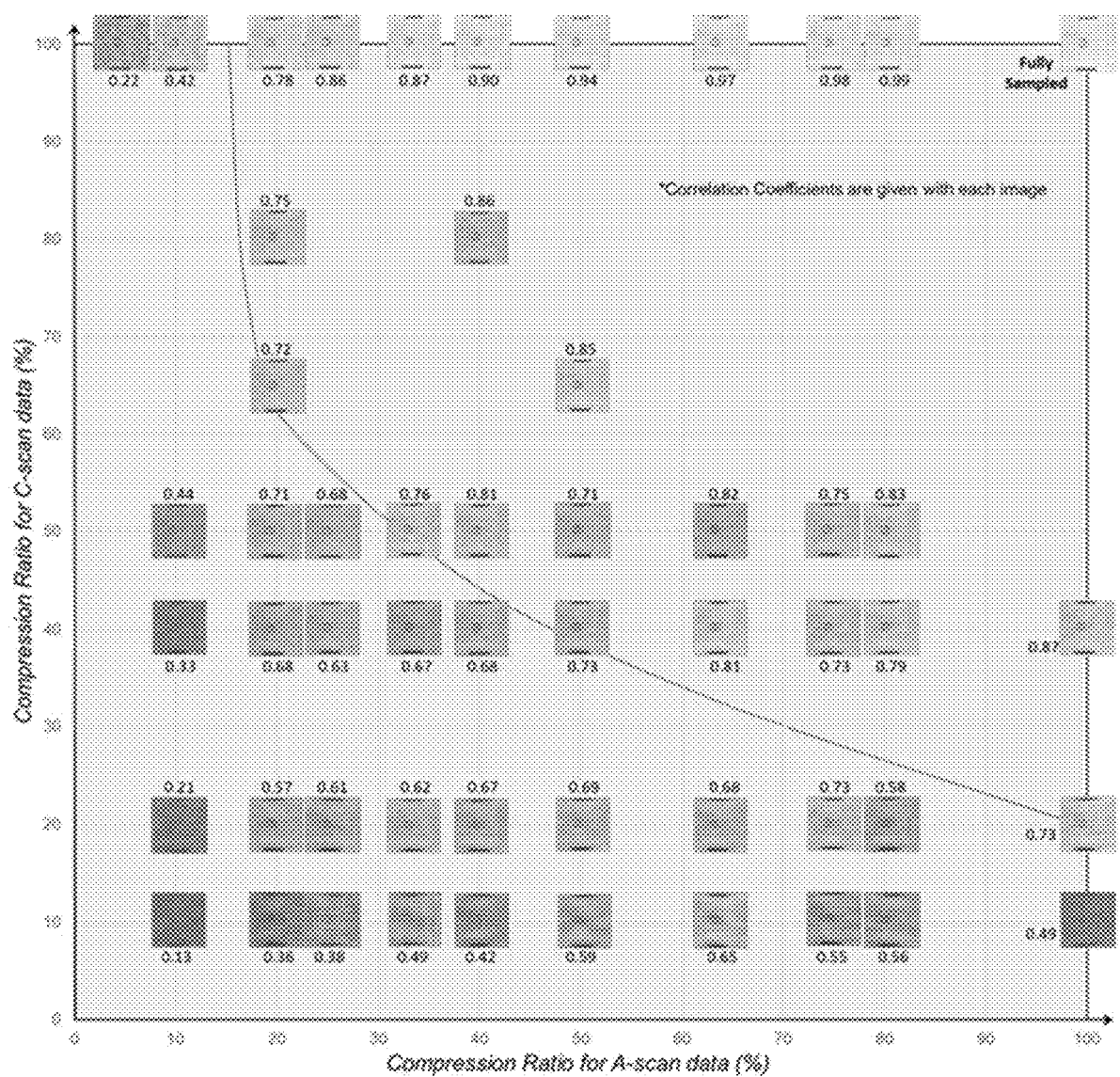
FIG. 41 shows C-scan images as a function of A-scan and C-scan compression ratios.

FIG. 41 shows the resulting C-scan images as a function of A-scan and C-scan compression ratios. The horizontal axis corresponds to Stage 1 compressive sensing (undersampled in time) and the vertical axis corresponds to Stage 2 compressive sensing (undersampled in space). The green area in the chart represents the zone with acceptable reconstructed C-scan images that have a correlation coefficient greater than 0.7. There are several reconstructed images to the left and below the green area that also have correlation coefficients above 0.7, but to guarantee good image reconstruction, it is advised to stay within the green region.

Methodology to Determine Probability-of-Detection as a Function of Compression-Ratio In Phase I, signal reconstruction ability was quantified through correlation coefficients, but the damage detection ability was evaluated qualitatively through diagnostic images. In Phase II, Advent is developing a methodology to generate probability-of-detection (POD) curves as a function of Compression Ratio (CR) to quantify accuracy of damage detection from undersampled data. Here, CR is defined as:

$$CR = \frac{m \times k}{N \times P}$$

where m is the number of temporally undersampled signal points, N is the full signal length, k is the number of spatially undersampled sensors (or image pixels), and P is the number of sensors (or image pixels) in a fully populated sensor array (or diagnostic image). Note that CR=1 for fully sampled data and less than 1 for undersampled data in both time and space.

POD is a popular metric used to quantify the damage detection capability of NDE/SHM systems and is defined as the probability that a given damage will be detected using a given inspection method. In practice, no NDE/SHM method provides 100% assurance on the damage size that is possible to detect because there is statistical uncertainty in all measurements due to the number of specimens tested, operator experience, damage characteristics, structural material/geometry, environmental changes, etc. Therefore, NDE/SHM reliability is typically expressed in terms of damage size that has a 90% POD with 95% confidence, after taking into account all variables that can affect detection.

Figure 42:
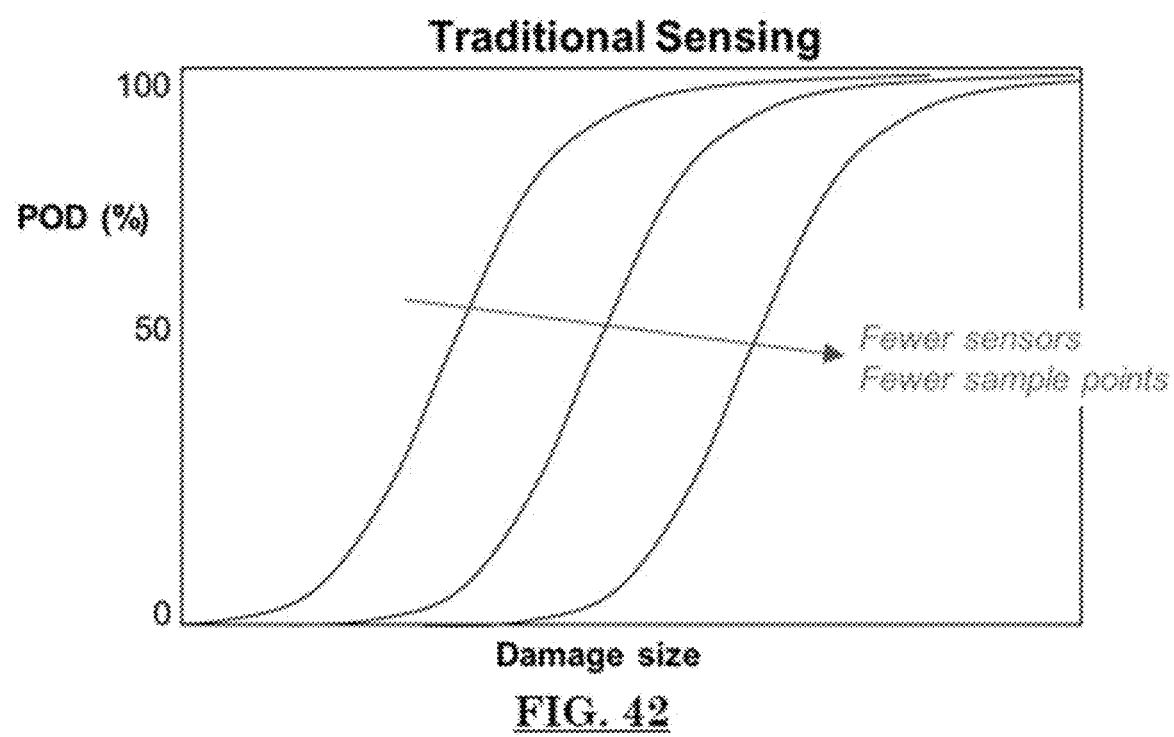
FIG. 42 shows a graph of POD curves for traditional sensing shift to the right when fewer measurements are used.
Figure 43:
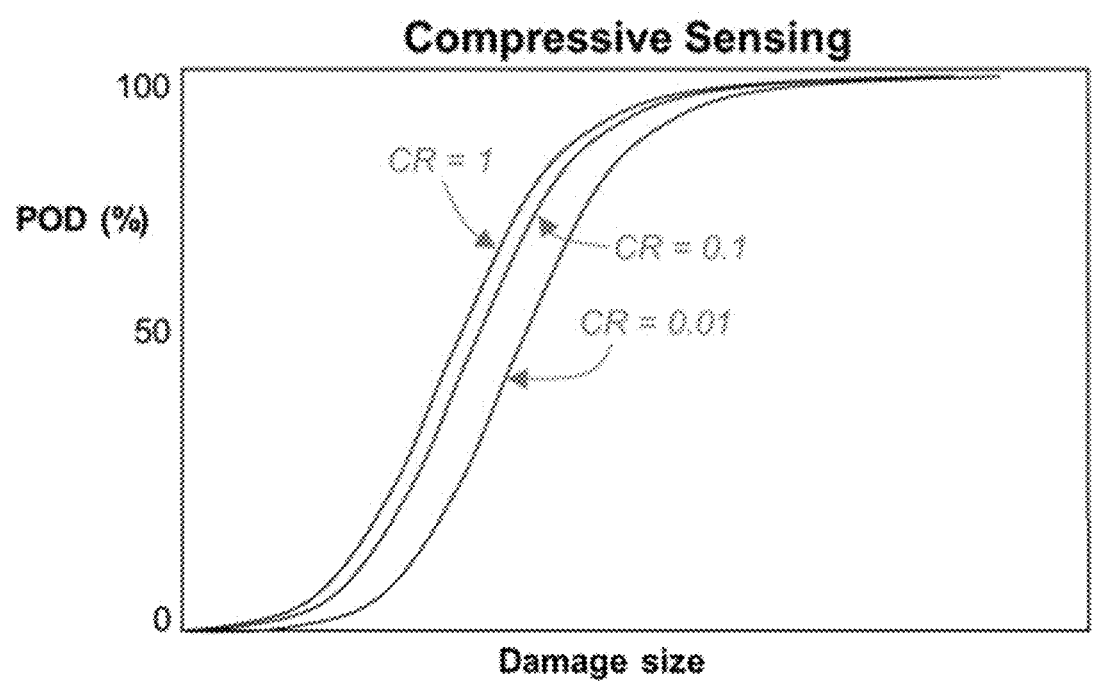
FIG. 43 shows a graph of POD curves for compressive sensing move back toward the fully sampled case.

In traditional sensing, as opposed to compressive sensing, using fewer sensors or fewer sample points per measurement tends to shift the POD curves to the right as shown in FIG. 42. But as was found in the Phase I study, the use of CS to reconstruct the undersampled data can restore the damage detection capabilities, which will move the POD curves back toward the fully sampled cases (FIG. 43).

Previously, signal reconstruction and diagnostic image reconstruction abilities have been quantified only through correlation coefficients. The quantification metrics have been expanded by developing a methodology to generate probability-of-detection (POD) curves as a function of compression ratio (CR) and the subsequent correlation coefficient (r) after reconstruction to quantify accuracy of damage detection from undersampled data.

The objective is to demonstrate that using fewer sensors or fewer sample points per measurement (CR<100%) can result in the same, or nearly the same, damage detection capabilities as fully sampled cases. In traditional sensing, using fewer sensors or fewer sample points per measurement tends to flatten and move the POD curves to the right. But the use of CS to reconstruct the undersampled data can restore the damage detection capabilities, which will move the POD curves back toward the fully-sampled cases.

There are many influencing factors that affect POD, including: the intrinsic capability of a given NDE/SHM method (physical process of signal detection of waves/rays from a material defect); damage type, size, and orientation; structural geometry and accessibility; environment (temperature, humidity, vibration); and human factors (inspector experience, inspection procedures, organizational protocol). Furthermore, there are many different methodologies/formulations for generating POD curves, depending on the application.

The goal of the developed methodology is to generalize the procedure for estimating the POD and make it applicable to all NDE/SHM methods that use CS to reconstruct undersampled data.

The methodology starts by representing the POD for the undersampled case (before CS reconstruction), $POD_u$, as a function of the original fully-sampled $POD_f$.

$$POD_u(a) = POD_f(a') \text{ where } a' = C_1(a - C_2)$$

Here, a is the defect size, and a' is a modified detectable defect size due to undersampling of the inspection data. $C_1$ represents a scaling of the detectable damage size, and changing the value will shift and skew the POD curve. $C_2$ represents a constant jump in the detectable damage size, and a change in value will result in a pure shift of the POD curve to the left or the right.

This generalized equation for a' can be simplified by noting that both undersampling in time (stage 1 CS) and undersampling in space (stage 2 CS) will result in a scaling of the detectable damage size rather than a constant jump. For example, for the case of the SAM data from the composite plate with induced debonds/delaminations (described in A-scan/C-scan composite plate example above) the CR is defined as:

$$CR = \frac{m \times k}{N \times P} \times 100\%$$

where m is the number of temporally undersampled signal points in each A-scan, N is the full signal length of each A-scan, k is the number of spatially undersampled pixels in the C-scan, and P is the full number of pixels in the C-scan. Note that CR=100% for fully sampled data and less than 100% for undersampled data in both time and space.

From geometry, undersampling in space results in a larger average distance between pixels, which effectively scales the detectable damage size proportional to CR. Therefore, we can approximate a' by setting $C_1 = CR$ and $C_2 = 0$, giving $$POD_u(a) \approx POD_f(CR \times a)$$

Figure 44:
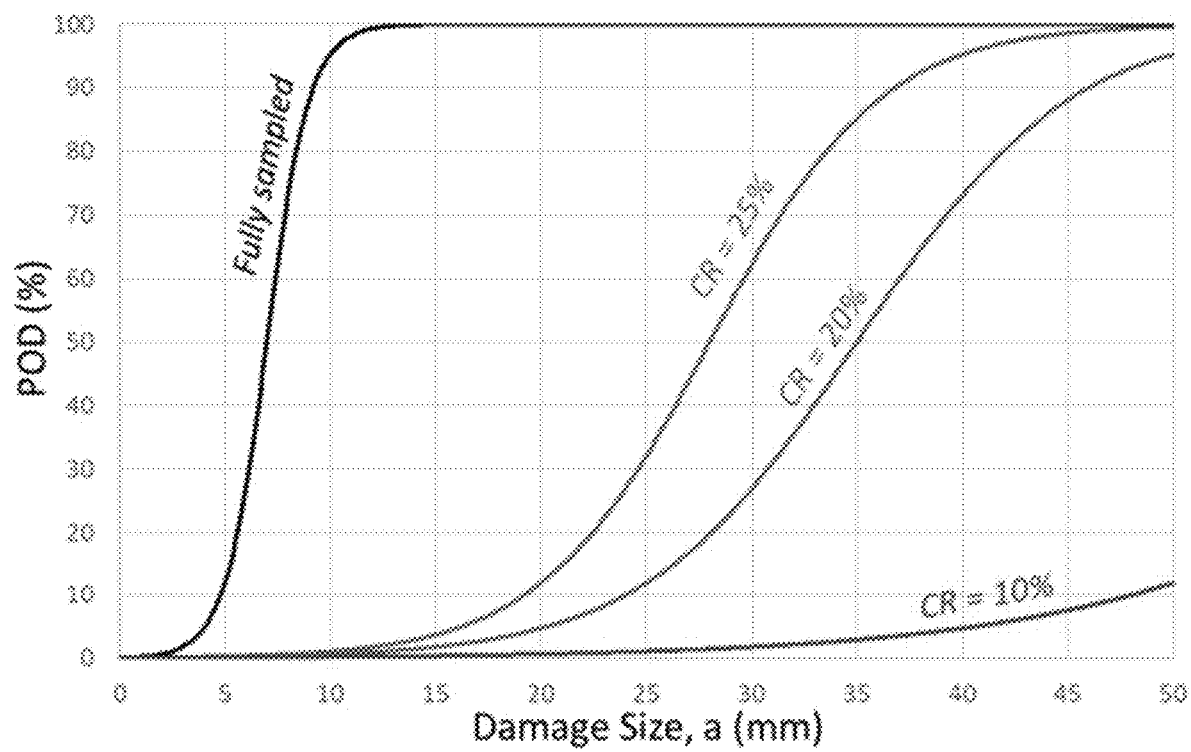
FIG. 44 shows a graph of example POD curves for undersampled data before CS reconstruction.

Example POD curves for CR values of 25%, 20%, and 10% are shown in FIG. 44. These values correspond to the C-scan data from FIG. 41, and the generated POD curves are before any CS reconstruction of the data.

Applying CS to reconstruct the undersampled data will restore the damage detection capability. We measure the data reconstruction using the correlation coefficient, r. The higher the value of r, the better the reconstruction, and the more the POD curve will move back toward the fully-sampled case.

All NDE/SHM systems have an inherent noise level, and two consecutive fully-sampled measurements will not be identical to each other due to the inherent noise in the system. The r value between two consecutive fully-sampled measurements is the highest r value we can expect a CS reconstruction to achieve, and if it does, then we can claim the data is fully reconstructed and the POD curve has shifted back to the fully-sampled case.

Using a similar formulation as before, the curves for the reconstructed case, $POD_r$, can be expressed as:

$$POD_r(a) \approx POD_f\left(\frac{r_r}{r_f} \times a\right)$$

Here, $POD_r$ is the POD for the reconstructed data, $POD_f$ is the POD for the fully-sampled case, $r_r$ is the correlation coefficient for the reconstructed case, and $r_f$ is the correlation coefficient between two consecutive fully-sampled measurements.

Figure 45:
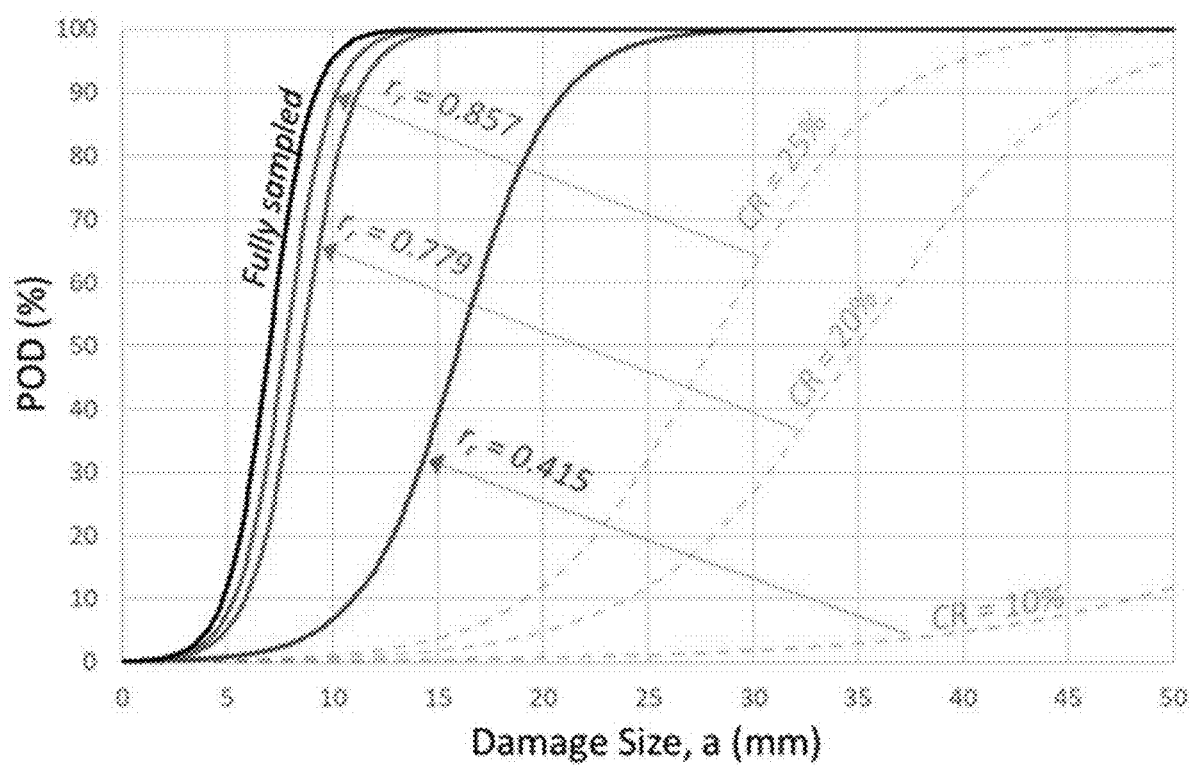
FIG. 45 shows a graph of example POD curves for undersampled data after CS reconstruction.

Example POD curves of the C-scan data after CS reconstructions are shown in FIG. 45. Here, we set $r_f = 0.95$, and used $r_r = 0.857$, 0.779, and 0.415 (corresponding to the CR values of 25%, 20%, and 10%, respectively). As can be seen, the reconstructions of the data for the CR=25% and 20% cases nearly restore the POD to the original curve.

Figure 46:
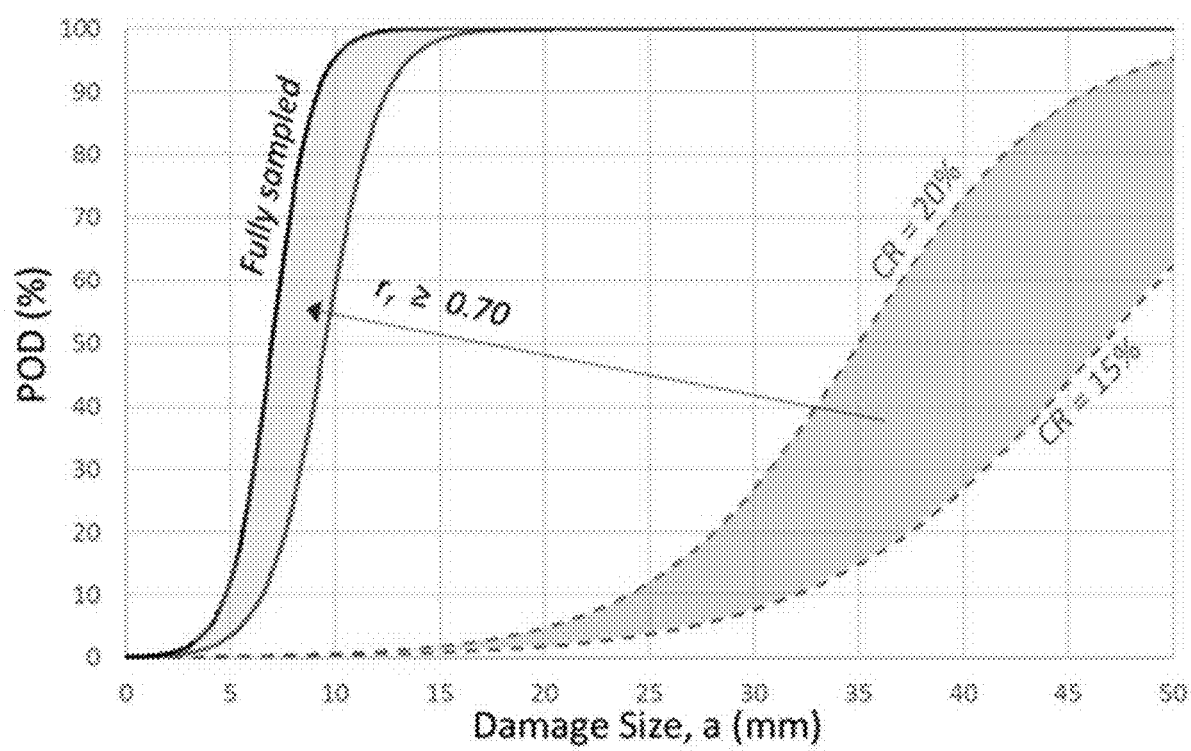
FIG. 46 shows a graph of example POD curves for undersampled data after CS reconstruction.

As another example, we use the image reconstructions from FIG. 41 that show the resulting C-scan images as a function of A-scan and C-scan compression ratios. The line in the chart in FIG. 41 separates the acceptable reconstructed C-scan images (correlation coefficients greater than 0.70) from the others. The combined compression ratio along this line falls between 15% and 20%, and the POD along this line before reconstruction is represented by the gray area in FIG. 46. After reconstruction, the POD for cases along the line shift to the left and fall within the green area in FIG. 46.

Methodology to Quantify Benefits of Compressive Sensing for NDE/SHM Applications Advent has developed a methodology to quantify the benefits that the CS approach can provide for NDE/SHM of large structures. The savings can be quantified in terms of: (1) data acquisition time, (2) data storage space, (3) reduction in number of required sensors, and (4) total weight of NDE/SHM systems. These quantified savings, in turn, are related to the POD curves developed above. The purpose is to give end users the ability to make informed decisions for new applications regarding number of sensors (or total NDE/SHM system weight) for a given critical damage size and associated POD.

Figure 47:
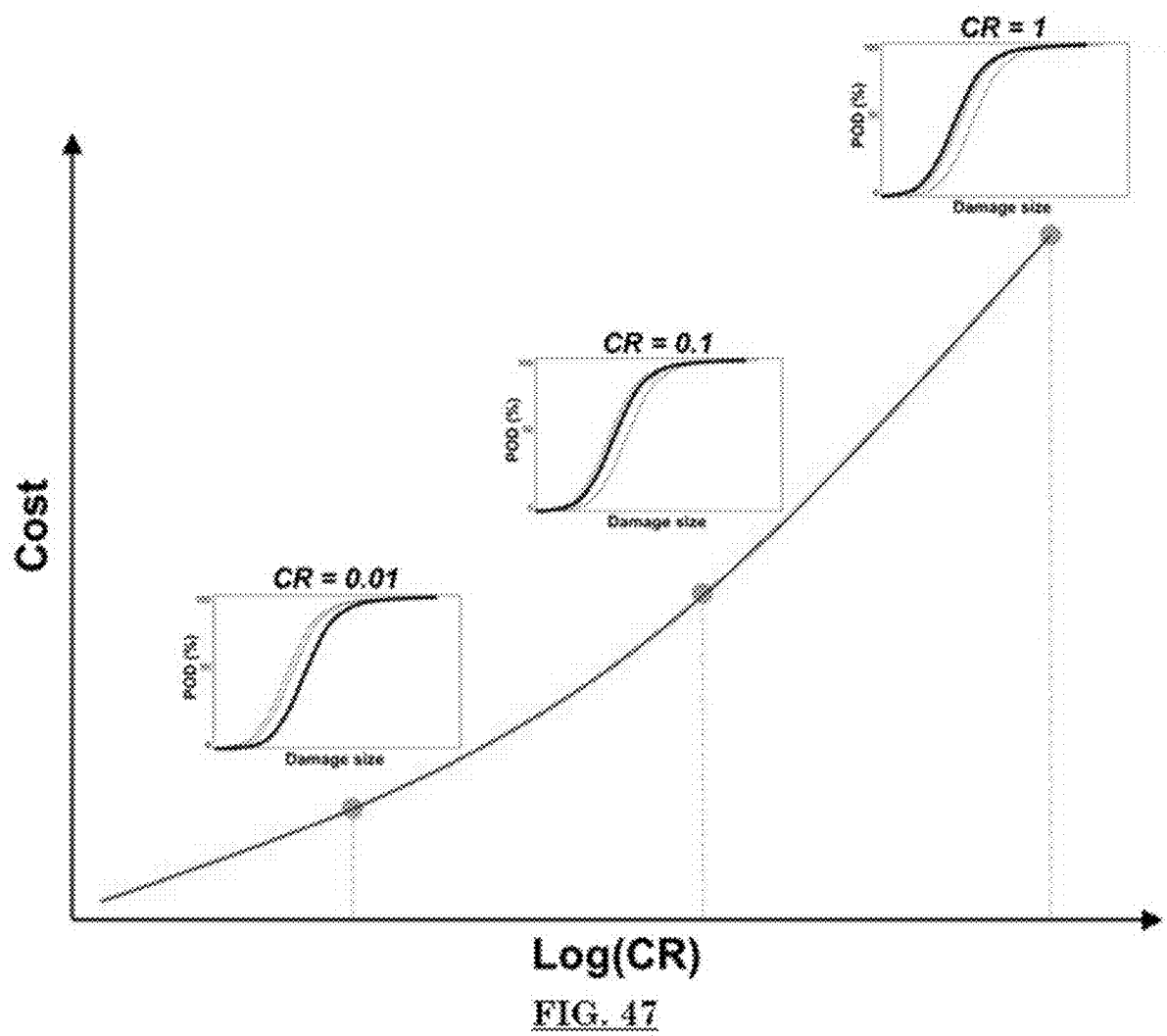
FIG. 47 shows a graph of quantified savings vs. CR and POD.

A general example relationship between cost, compression ratio, and POD is shown in FIG. 47. Here, cost could be data acquisition time, data storage space, number of sensors, total NDE/SHM system weight, or a combination of all the above. Each point on the curve corresponds to a particular CR, which corresponds to a particular POD curve.

Figure 48:
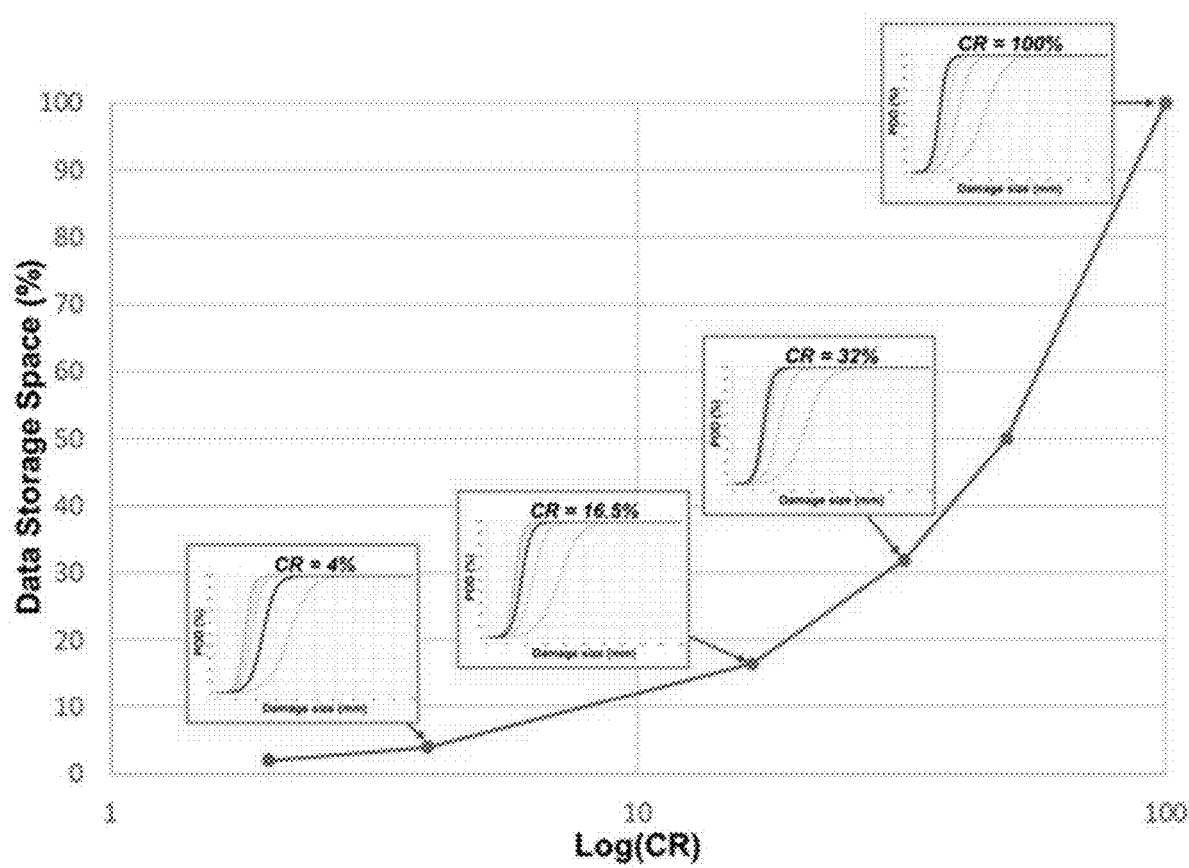
FIG. 48 shows a graph of data storage space vs. CR and POD.

An example relationship between data storage space (cost), compression ratio, and POD is shown in FIG. 48. Recall from the composite plate example above that each C-scan image contains 125-pixels×125-pixels, for a total of 15,625 pixels. And each pixel contains a time-domain signal vector that is 76,001 sample points in length. These time-domain signals were initially reduced to 15,000 sample points by taking only the portion between the top surface and bottom surface reflections. This by itself reduced the file size to less than 20% of its original size. Then the data file size was reduced further using random downsampling and compressive sensing. The chart in FIG. 48 is showing the further reduction that is only due to compressive sensing (which is in addition to the already-compressed file size).

As can be seen, the system maintains high POD capability, even when the file size is reduced to about 10% of the already-compressed file size (or about 2% of the original file size).

The methods and systems disclosed herein may be carried out on one or more electronic computing platforms such as a hand-held device, laptop, desktop computer, workstation with a single or multi-core processor, server with multiple processors, and/or cluster of computers, for purposes of example only and not intended to be limiting. For example, a diagnostic device may include a processor and server in communication with a sensor array. The diagnostic device may provide a diagnostic display screen to a user and may communicate commands to the server for further processing of the user's inputs through the diagnostic screen, such as changing the display, engaging software platforms, engaging subroutines, switching modules, etc.

According to another aspect, computer readable media and devices are provided to collect signals, analyze and reconstruct same and provide damage diagnostics for a structure according to the various processes described herein. Many of the techniques described herein can be implemented in hardware, firmware, software, or a combination thereof. In one embodiment, the technology is on a programmable computer that includes a processor, a processor-readable storage medium (including volatile and non-volatile memory and/or storage elements), and suitable input/output devices, respectively. Implemented in a computer program that runs. The program code is applied to the data input using the input device to perform the functions described and to generate output information, such as reconstructed signals and/or damage estimates/projections. The output information applies to one or more output devices. Also, each program is preferably implemented in a high-level procedure or object-oriented programming language to communicate with a computer system. However, the program can be implemented in assembly or machine language if desired. In any case, the language can be a compiled or interpreted language.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for employing compressive sensing to sense damage in a structure comprising:
    employing at least one spatially undersampled sensor array;
    obtaining at least one temporally undersampled sensor signal from the at least one spatially undersampled sensor array;
    employing compressive sensing to reconstruct data from the at least one temporally undersampled sensor signal to generate a reconstructed signal;
    generating a diagnostic image of the structure based on the reconstructed data.

2. The method for employing compressive sensing to sense damage in a structure of claim 1, wherein the at least one temporally undersampled sensor signal results from missing actuator-sensor paths in the sensor array.

3. The method for employing compressive sensing to sense damage in a structure of claim 1, wherein the method is employed to diagnose a space structure.

4. The method for employing compressive sensing to sense damage in a structure of claim 1, wherein the method employs at least one algorithm processed by an ultrasound software package.

5. The method for employing compressive sensing to sense damage in a structure of claim 1, wherein the method reconstructs at least one sensor signal via using the at least one temporally undersampled signal, an appropriate basis function, and a measurement matrix.

6. The method for employing compressive sensing to sense damage in a structure of claim 5, further comprising utilizing a subroutine to determine a best basis function for the at least one temporally undersampled signal.

7. The method for employing compressive sensing to sense damage in a structure of claim 6, further comprising wherein the subroutine incorporate a Gini Index to find a basis function that provides a sparsest signal in a transform domain.

8. The method for employing compressive sensing to sense damage in a structure of claim 1, wherein the at least one temporally undersampled signal comprises an ultrasound signal.

9. The method for employing compressive sensing to sense damage in a structure of claim 4, wherein the algorithm is a sparse recovery algorithm.

10. The method for employing compressive sensing to sense damage in a structure of claim 9, wherein the sparse recovery algorithm comprises $\ell$1-norm minimization.

11. A diagnostic method for employing compressive sensing comprising:
receiving a sensor signal from a sensor network affixed to a structure that transmits at least one signal to the structure and receives the at least one signal after encountering the structure;
wherein when the sensor signal received from the sensor network is undersampled in time and/or undersampled in space, the diagnostic method:
engage at least one preprocessing module to run only once to generate at least one basis function for at least one compressive sensing algorithm;
engage at least one signal reconstruction module containing the at least one compressive sensing algorithm, wherein the at least one reconstruction module reconstructs at least one temporally undersampled sensor signal;
engage at least one second reconstruction module containing the at least one compressive sensing algorithm to reconstruct at least one spatially undersampled sensor signal; and
determining whether damage has occurred to the structure via reconstruction of at least one temporally undersampled sensor signal and/or at least one spatially undersampled sensor signal.

12. The diagnostic method for employing compressive sensing of claim 11, wherein the diagnostic method is employed with at least one structural health monitoring system.

13. The diagnostic method for employing compressive sensing of claim 11, wherein the diagnostic method engage at least two preprocessing modules.

14. The diagnostic method for employing compressive sensing of claim 11, wherein the at least one signal is an ultrasound signal.

15. The diagnostic method for employing compressive sensing of claim 11, wherein the method reconstructs at least one reconstructed sensor signal via using the at least one signal, an appropriate basis function, and a measurement matrix.

16. The diagnostic method for employing compressive sensing of claim 15, further comprising utilizing a subroutine to determine a best basis function for the at least one signal.

17. The diagnostic method for employing compressive sensing of claim 16, further comprising wherein the subroutine incorporate a Gini Index to find a basis function that provides a sparsest signal in a transform domain.

18. The diagnostic method for employing compressive sensing of claim 11, wherein at least one compressive sensing algorithm is a sparse recovery algorithm.

19. The diagnostic method for employing compressive sensing of claim 18, wherein the sparse recovery algorithm comprises $\ell$1-norm minimization.

* * * * *